US005566084A

United States Patent [19]
Cmar

[11] Patent Number: 5,566,084
[45] Date of Patent: Oct. 15, 1996

[54] PROCESS FOR IDENTIFYING PATTERNS OF ELECTRIC ENERGY EFFECTS OF PROPOSED CHANGES, AND IMPLEMENTING SUCH CHANGES IN THE FACILITY TO CONSERVE ENERGY

[76] Inventor: Gregory Cmar, 379 Namant Rd., Namant, Mass. 01908

[21] Appl. No.: 323,526

[22] Filed: Oct. 14, 1994

Related U.S. Application Data

[63] Continuation of Ser. No. 25,290, Mar. 2, 1993, abandoned.
[51] Int. Cl.$^6$ ............................. G06F 17/18; G06G 7/122
[52] U.S. Cl. .......................... 364/492; 364/493; 364/505; 364/464.04; 395/77; 395/925
[58] Field of Search .............................. 364/464.04, 505, 364/492, 493; 395/925, 77

[56] References Cited

PUBLICATIONS

Forsstroem T. et al., Abstract; titled: Linear Programming Energy and Environment Model for Space Heating, Finland, 1990.
Goyal, A. K. et al., Abstract, titled: Optimization of a hybrid solar forced–convection water heating system, 1987, UK, Energy Conversion and Management vol. 27, No. 4 pp. 367–377.

Akbari, Hashem et al, "An Algorithm to Disaggregate Commercial Whole–Building Hourly Electrical Load Into End Uses", *Proceedings of the ACEEE 1988 Study of Environmental Efficiency in Building*, vol. 10: 13–26 LBL 25185 (1988).

*Primary Examiner*—Emanuel T. Voeltz
*Assistant Examiner*—Kamini Shah
*Attorney, Agent, or Firm*—Rines and Rines

[57] ABSTRACT

A process for identifying patterns of electric energy consumption and demand in a facility and determining possible changes in the facility for energy conservation, using monthly electric billing data over the years to ascertain billing periods and KW and Kwh consumption and to obtain from the ration Kwh/KW the hours use of peak demand per week, which provides a useful estimate of hours of use for the facility. Together with minimal facility data (just area data) and daily maximum and minimum outside temperature data, the process identifies patterns of consumption and demand, and then uses conveyance of an empirical analysis to disaggregate billing data into lighting, power, and HVAC end-use categories, and a statistical analysis, including regression, to separate the same billing data into usage and temperature-dependent components. Proposed retrofits for energy conservation are indicated and then implementable. Actual savings are calculated and used to further refine the model of actual facility operation.

19 Claims, 14 Drawing Sheets

FIG. 7A  HOURS OPERATION PER DAY
END USE BY BILLING PERIOD
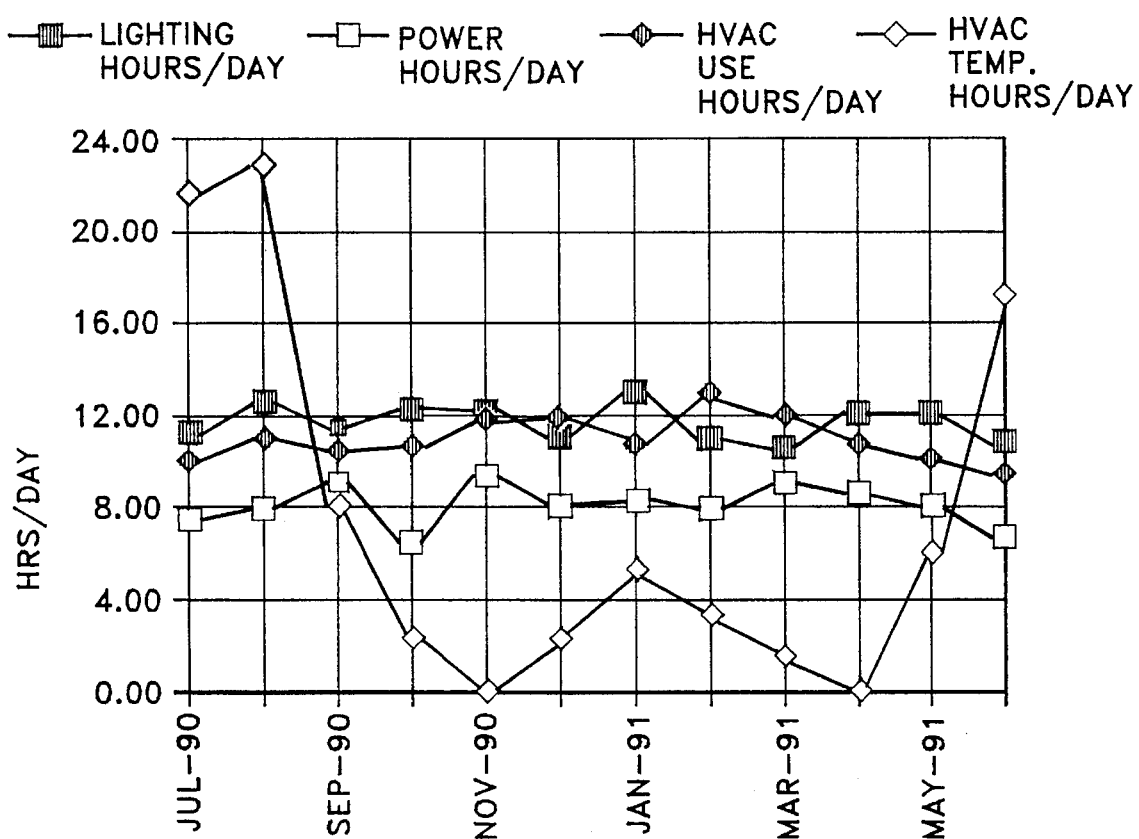
FIG. 7B
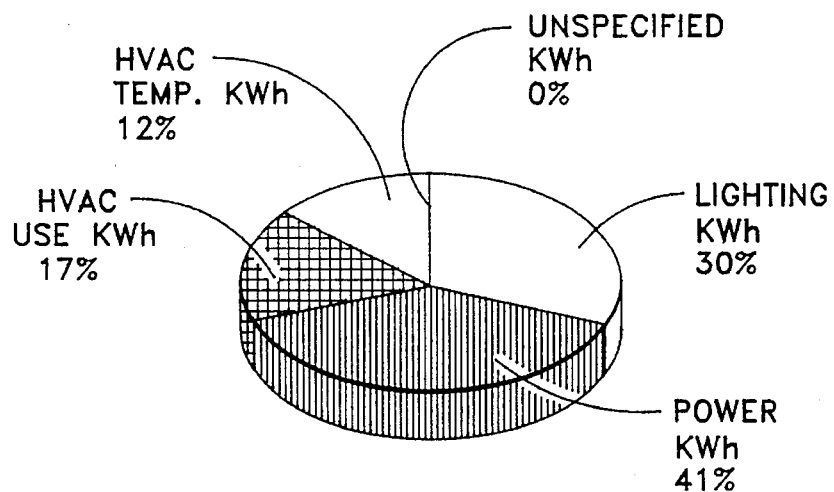

FIG. 8C

- ☐ HC- TEMP DEPENDENT
- ☐ HC- 24 HOURS PER DAY
- ☐ HC- 24 HOURS PER DAY
- ☐ HC- 24 HOURS PER DAY
- ☐ HC- SHIPPING
- ☐ HC- SHIPPING
- ☐ HC- HEATING PLANT
- ▦ HC- HEATING PLANT
- ▨ HC- R&D AREAS
- ▩ HC- R&D AREAS
- ▥ HC- R&D AREAS
- ▤ HC- R&D AREAS
- ☐ HC- R&D AREAS
- ☐ HC- HIGH BAY

- ▨ HC- CUSTOMER SERVICE
- ▩ HC- PRODUCTION
- ▥ HC- MACHINE SHOP
- ▤ HC- MACHINE SHOP
- ☐ HC- BUILDING 79
- ☐ HC- BUILDING 78
- ☐ HC- BUILDING 78
- ▨ PWR- 24 HOURS PER DAY
- ☐ PWR- 24 HOURS PER DAY
- ☐ PWR- WAVE SOLDER
- ☐ PWR- NC MACHINE
- ☐ PWR- REFRIGERATOR
- ▦ PWR- LONG USE EQUIPMENT
- ▨ PWR- SHORT USE EQUIPMENT
- ▩ PWR- PRINTERS
- ▥ PWR- PC'S
- ☐ LTG- EXTERIOR DUSK TO DAWN
- ☐ LTG- 24 HOURS PER DAY
- ▦ LTG- MACHINE SHOP
- ▨ LTG- PANEL LP2-2 CAFETERIA
- ▩ LTG- PANEL L9- SHIPPING
- ▥ LTG- PANEL L4- ASSEMBLY
- ▤ LTG- PANEL LC/EC- STOCKROOM
- ☐ LTG- PANEL HPG3- BLDG 78 LOW
- ☐ LTG- PANEL LP2-1- BLDG 78/INC
- ☐ LTG- PANEL L7- BOARD ASSEMBLY
- ☐ LTG- PANEL HPG1- BLDG 78/FI
- ☐ LTG- PANEL L3- CUST SUPPORT
- ◈ WEEKDAY ACTUAL

PROCESS FOR IDENTIFYING PATTERNS OF ELECTRIC ENERGY EFFECTS OF PROPOSED CHANGES, AND IMPLEMENTING SUCH CHANGES IN THE FACILITY TO CONSERVE ENERGY

This is a file wrapper continuation of parent application Ser. No. 025/290, filed Mar. 2, 1993 now abandoned.

The present invention relates broadly to processes for analyzing and identifying patterns of electric energy consumption and demand in a facility, more particularly involving analyzing electric power billing data for the facility and isolating usage and temperature-dependent consumption and demand, while simultaneously disaggregating the bills into component end-users; being specifically directed to using the resulting patterns describing existing facility power operations to predict and then verify the effect of changes which might be made to the facility for implementation in the facility with resulting energy conservation.

BACKGROUND

Particularly within the past decade or so, substantial effort has been made to provide techniques for disaggregating or decomposing total building or other facility energy consumption usage or load into the actual principal end-use in the facility in order to obtain an understanding of the energy uses in the facility, from which improvements in energy consumption can be suggested, evaluated and hopefully ultimately implemented. Not only is the consumer interested in the economy and energy saving, but also there is often no sales tax levied on manufacturing use of power as distinguished from other uses, making segregation of uses of value; and the utilities themselves obtain incentives in public utility commission rate setting for energy conservation, as well.

Among these techniques are those using utility electric bills, building audit data, end-use metering and computer simulation as sources of information as to the facility's energy performance. One such example is described in an article, entitled "An Algorithm to Disaggregate Combined Whole-Building Hourly Electric Load into End-Uses" by H. Akbari et al, of Laurence Berkeley Laboratory, appearing at pages 10.13 through 10.26 of a U.S. Department of Energy publication identified as under Contract No. DE-ACU3-76SF00098,1989, and in which an extensive bibliography of prior techniques is presented. Limitations in prior approaches to analysis through the disaggregation of monthly electric utility billing data into end-use or time-of-use information are pointed out in said article, including the general requirement for complete detailed building information, insufficient detail on time of use and building operations within such monthly data, aggregation of daytime with nighttime use as well as weekday with weekend use, and other limitations. Such has led Akbari et al, in said article, and others skilled in this art to conclude that only end-use load profile information, as through end-use submetering on the real operation of a building and the end uses within it, can provide the appropriate disaggregation information.

In accordance with the present invention, however, new techniques have been developed for more effective use and analysis of electric utility billing data in consort with other information that obviate such and other limitations and, indeed, through reiterative processing of data recollation and re-analysis, can operate with minimal data (as well as, of course, with complete data for a facility), and ultimately provide a greater level of certainty about what is happening in the building concerning the consumption of energy.

The electrical work week (EWW) (hours use of peak demand per week) is extremely significant for developing the rules (the expert system) regarding how to disaggregate an electric bill. Such rules for disaggregating a bill are developed by auditing hundreds of buildings, though each building does not have to have a complete audit. Various subsets of the building population are constructed with the primary determinants being building functions (SIC code) square footage, demand per square foot, consumption per square foot and EWW. Statistical population norms are developed for each identifiable subset, thereby allowing the disaggregation model to 'Learn' as it grows, as more fully later described.

Underlying the significant improvement of the present invention, indeed, is the apparently heretofore missed significance that such hours of peak demand per week can provide an excellent basis for estimating hours of use for the facility—such being readily obtainable by providing both kilowatt (KW) and kilowatt hours (Kwh) information, dividing Kwh by KW, and normalizing the result to a seven-day period.

Indeed, the process underlying the present invention proves erroneous the current belief in the art that monthly data provides insufficient detail and that detailed building information is required; providing a modeling system which is designed to develop accuracy from monthly data through recursive processing of the information fed into it and developed by it. Through obtaining hours of use by dividing the monthly Kwh by peak demand KW (i.e., the ratio Kwh/KW=Hours), and disaggregating peak demand to obtain an effective connected load by end-use at peak demand (and with check figures to validate assumptions), and then testing the predicted assumption over an entire 12-month period, the present invention, at the point that sufficient data has been gathered from a statistically sufficient portion of the population, overcomes the need for detailed information to obtain reasonable results from only the billing data and square footage.

The elimination of such need for detailed information at the point that sufficient data has been gathered from a statistically significant portion of the population is particularly highly important for energy conservation potential analysis and for energy savings verification.

To illustrate the expert system segment of the disaggregation model, the following summary example may be considered.

A retail store, as an illustration, has a highly consistent pattern of use (store hours). Multiple linear regression of bills has proven this assertion. To achieve a lighting system retrofit, a detailed inventory of the fixtures is performed. Existing connected load is based upon manufacturer's data, and energy conservation potential is calculated from the differential between existing and proposed connected load and an estimate of hours of operation. After such retrofit is performed, the actual Kwh savings is calculated by comparing a base year consumption, which is adjusted for weather variation to the current year consumption, as later more fully discussed. The variation in peak demand is also calculated by subtracting current year demand from base year.

The resulting answer may now be compared with estimates. The change in effective connected load at peak demand (ECLPD) which was recorded by the utility billing allows fine tuning of the original estimate. The actual Kwh savings allows refinement of the estimate of hours of operation. With such performed a few dozen times, enough significant data can be gathered to predict what is happening in a building for which only the bills, its use and the square footage is available. This also provides the ability accurately to estimate the energy conservation potential.

By inputting the standard hours of occupancy for the building for every day in the billing period, therefore, and collating this fact to the billing period and deriving the total hours of operation from the bill, problems of the aggregating of daytime and nighttime use as well as weekday with weekend use are admirably overcome. Strong statistical correlations are achieved with the process of the invention by optimizing the lighting/power and process hours of operation of effective connected load at peak demand.

In a preferred modeling system, the power end-use contains the process load, as opposed to a combined lighting and power end-use with separate process end-use. Such is accomplished as hereinafter explained by the ability of the model to handle operating schedules.

This is effected by defining sub-classes of each end-use. Lighting, for example, is comprised of offices, hallways, bathrooms, closets, etc. according to building SIC code and other statistics developed in the expert system.

A critical component of the novel process of the invention, indeed, is the discovered capability to expand the structure of the data collection from a minimalist viewpoint to a very precise representation of what is transpiring in the building, with the end-use categories disaggregated into their individual components and devices, and/or aggregated into sets of data which correspond to the patterns of information needs of the facility operators. If, moreover, the billing information provides peak and off-peak consumption data, then hours of use can be cross-correlated to the time periods as defined by the particular utility.

The process of the invention, indeed, simultaneously disaggregates the utility bill while it develops an optimal set of statistics which accurately describe the monthly variations in billing data. To effect this analysis, a regression equation is employed to establish a relationship with weather that is both linear (to describe the hours of use components of the bill) and polynomial (because the relation of consumption to weather is a curve)—$OAT+OAT^2$ (outside average temperature).

Some buildings, moreover, may require more than a second order polynomial regression of OAT (weather). The process, therefore, defines a methodology which selects the best curve. Quite simply, it regresses weekdays, weekends, (accounting for annual variation in occupancy) and multiple orders of OAT, and selects the best correlation and F-test combination.

The process further defines certain normative statistics which allow the user to know whether the bill is actually being properly disaggregated; and, as before-pointed out, it operates extremely well with minimal data for a facility (as well as with complete data, if available). Through developing or predicting an appropriate load shape for the effective connected load at peak demand (ECLPD) for lighting, power (plug load and office equipment) and process (production related) and end-use categories in the facility, such as a predicted square wave representing weekly power consumption, the regression analysis can verify and optimize the assumptions as to the load shape according to what patterns of consumption and demand actually happen at the facility; in short, verifying and modifying original predictions or assumptions as to such patterns and hours of use, within a predetermined margin, to develop a regression equation with high correlation and minimal monthly residuals.

One of the elegant uses of this "square wave" (the nature of the visual display conveys better information if it is displayed as stacked area charts) is to incorporate limited real time monitoring with the estimating process. Basically, a recording meter may be used for 1 week or longer to produce an actual operating hour/demand curve to compare with estimates. The incorporation of such real time data significantly improves the reliability of the disaggregation for any particular building.

As previously mentioned, if more than one time period is described by the utility bill (such as peak, shoulder and off-peak hours of consumption) then the analysis is performed for each time period.

An expanded hours of operation data input screen used together with the previously mentioned "square wave" display greatly simplifies the required entry. In conjunction with a utility bill which covers multiple time periods, this method allows for an automated fine tuning of assumptions.

OBJECTS OF THE INVENTION

A primary object of the present invention, therefore, is to provide a new and improved process which will identify patterns of electric energy consumption and demand in a facility, predict the effects of proposed changes in order to enable ultimate implementation of the same in the facility, and verify the effect of the conservation of energy through novel analysis and processing of electric utility billing data in consort with other information—such obviating the above-described and other prior art process limitations.

A further object is to provide such a novel process that determines both KW and Kwh information as a basis for estimating hours of use for the facility, and simultaneously disaggregates the utility bills into their individual use components while developing an optimal set of statistics, derived with a combined linear and polynomial regression equation, to describe accurately the monthly variations in billing data.

Other and further objects will be hereinafter described and are more fully delineated in the appended claims.

SUMMARY

In summary, from one of its important aspects, the invention embraces a process for identifying patterns of electric energy consumption and demand in a facility having lighting, power and heating, ventilation and air conditioning (HVAC) energy-consuming devices distributed therethrough, and determining possible changes in the facility and its devices for energy conservation, that comprises, providing monthly electric billing data for the facility over a twelve consecutive month period to ascertain therefrom billing periods and Kw and Kwh consumption and to obtain from the ratio thereof (Kwh/KW) the hours of peak demand per week, which provides a useful estimate of hours of use for the facility; providing facility area data and daily minimum and maximum outside weather temperature data in the twelve months; identifying from the provided and collated data, patterns of energy consumption and demand; disaggregating KW demand among end-use of lighting, power and HVAC use-dependent, and producing estimates of their effective connected load at peak demand, while attributing the remaining KW not distributed among such end-uses to HVAC temperature-dependent end-use; disaggregating energy consumption according to end-use by using the said estimate of hours of use of the facility and attributing remaining consumption to HVAC end-use; performing a statistical analysis by appropriate equations providing for regressing consumption against said outside temperature data and for lighting, power and HVAC use-dependent hours of operation; adjusting the hours of operation estimates across the monthly data within defined limits for lighting, power and HVAC use-dependent end-uses for a best-fit curve and optimization; and predicting energy conservation potential by analyzing performance characteristics of proposed retrofit changes against existing operation conditions.

Preferred and best mode embodiments will hereinafter be set forth.

DRAWINGS

The invention will now be described with reference to the accompanying drawings, FIGS. 1A and 1B of which are block diagrams of data collection and reiterative recollation and re-analysis, and of data analysis processing, respectively;

FIG. 2 is a chart representing an exemplary eight hour, five days per week load shape pattern;

FIG. 3, presented as successive FIGS. 3A–3F, is a flow chart of preferred embodiment of the preliminary analysis phase of the process of data collection and disaggregation of utility bill information in consort with other information, including weather and general statistics about facility energy consumption;

Figure 6A:
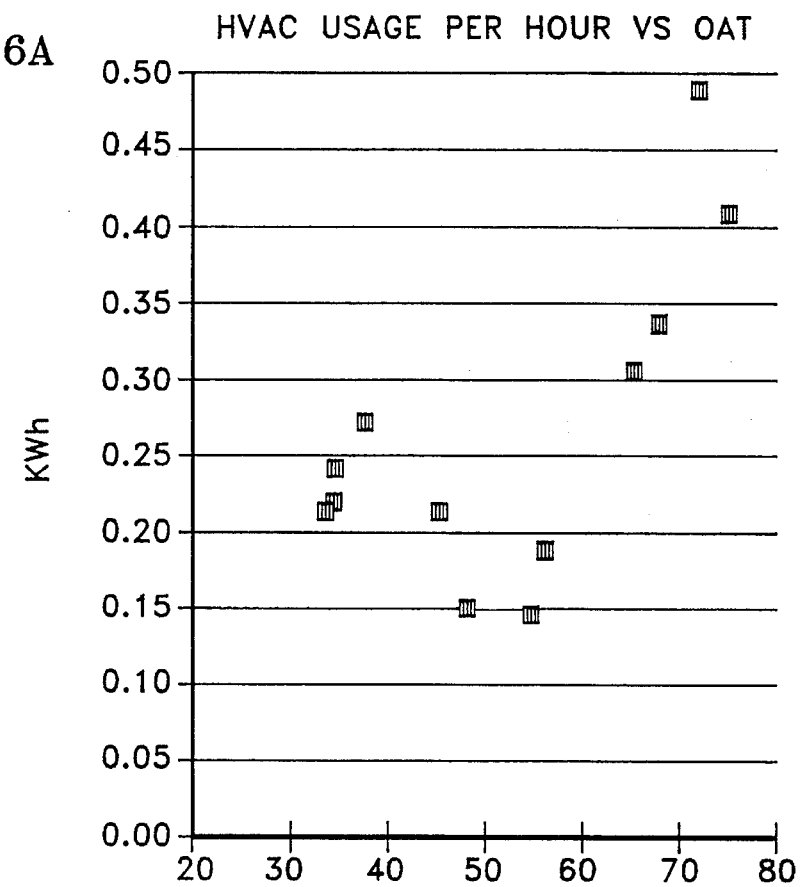
Figure 6B:
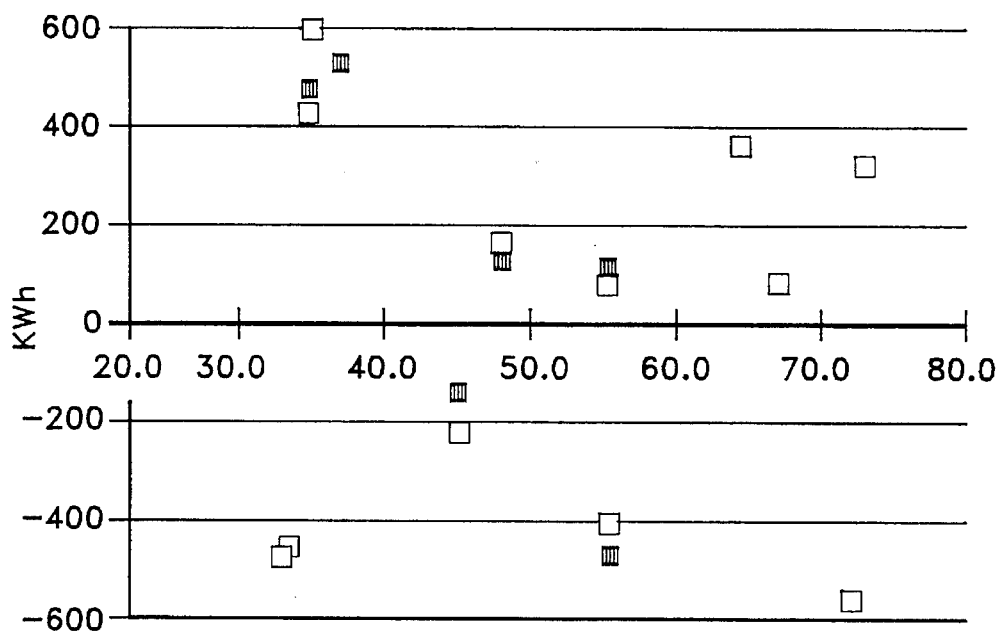

FIGS. 6A and 6B are graphs, respectively of HVAC usage per hour versus OAT and regression residuals versus OAT for the illustrative statistical analysis of billing factors tabulated, in later-presented Table 3; and FIGS. 7A and 7B respectively present in graphical and pie-chart form exemplary hours of operation per day by end-use by billing period; and FIGS. 8A and 8B–8C respectively illustrate typical weekday and week-end hourly consumption profiles.

DESCRIPTION OF PREFERRED EMBODIMENT(S) OF INVENTION

As previously explained, in accordance with the process of the invention, utility electric billing data for a facility is analyzed. Use and temperature-dependent consumption and demand are isolated while simultaneously disaggregating the bills into their component end-uses. After patterns describing existing operations have been developed, they are used to predict the effect of changes which might be made to the facility.

Variations between predicted energy savings and actual savings are reconciled over time by making adjustments to the original estimates for the base year. As the expert system learns, new estimates for different facilities are honed in so they will more closely predict actual results. The results from actual changes made are then quantified through comparative analysis of the before and after electric billing data.

One of the core features of the process is its methodology to identify patterns of consumption and demand. The technique used requires convergence of an empirical analysis to disaggregate billing data, and a statistical analysis to separate the same billing data into usage and temperature-dependent components. The minimum information required to start the methodology of analysis is:

1) 12 consecutive months of electric billing data (billing period, KW and Kwh);

2) 12 corresponding months of NOAA weather data (daily minimum and maximum temperatures used to construct the mean daily temperature which is also supplied by the same NOAA tables except they are accurate only to the nearest degree);

3) building area (gross square feet); and 4) 12 corresponding months of daily hours of occupancy with percentage use of the facility.

As earlier set forth, the empirical analysis to disaggregate utility billing data begins by defining end-use categories: lighting; power and process (plug load and office equipment); HVAC use-dependent and HVAC temperature-dependent uses (fans, pumps, cooling, heating). The first step is to disaggregate KW demand among the end-uses.

The disaggregation of peak demand occurs in three manners. Use-dependent peak demand is isolated by first defining that connected load which will logically be present during peak demand versus that which is improbable: i.e. office lights versus closet lights. Next, temperature-dependent peak demand over the twelve month period is isolated by identifying the peak demand for each month which exceeds the minimum peak demand for the year. Lastly, the effective connected load for lighting, process and the use-dependent portion of HVAC is determined by visual inspection.

The before-mentioned ECLPD can now be calculated for each month. It has been separated from direct connection with the hours modifier (annual schedule).

Estimates are made and refined for lighting, power and HVAC use-dependent uses to define their effective connected load at peak demand. These are held at a constant level across all billing periods except as modified by changes in full load occupancy (where full load occupancy equals total or 100% usage of the facility). HVAC temperature-dependent demand is then calculated as the remaining KW not distributed among the other end-uses.

Consumption is disaggregated according to end-use by applying and refining the hours of operation for the facility. The "hours of operation" are defined as a percentage of the hours which the building is occupied plus a percentage of the hours when the building is effectively unoccupied. As with KW demand, HVAC temperature-dependent hours of operation are defaulted to a value encompassing the Kwh remaining after the other end-use consumption is distributed.

Considerable sophistication as well as elegance may be added to the identification of hours of operation. Each use-dependent device, or estimate of device connected load, is attached to a schedule (Monday through Friday and a Saturday through Sunday schedule). Each schedule is assigned to occupied and unoccupied percentage of operation. Lastly, each device is also attached to an annual schedule, in order to allow for seasonal variations in occupancy, such as might be present in a school. The EWW is used to provide the clues as to how this disaggregation within devices is performed among the end-uses.

The statistical analysis is next performed. Two multiple linear regression analysis are simultaneously completed. The first analysis looks at the total bill, regressing consumption against a polynomial of outside temperature, lighting, power and HVAC use-dependent hours of operation. The second regression examines the HVAC end-use consumption against a polynomial of outside temperature, and HVAC use-dependent hours of operation.

A best fit curve for both regression analyses is developed by adjusting the hours of operation estimates across the monthly data within defined limits for lighting power and HVAC use-dependent end-uses. Best fit curve is defined as maximizing the $r^2$ confidence interval and minimizing the residual values for both regression equations where r is the conventional symbol used in statistics to describe the sample coefficient of correlation between two populations.

As the process continues, supplemental data is added to the end-use descriptions through a site survey of connected loads. These connected loads are profiled according to demand and usage. At minimum, demand is characterized as being a member of one or more of constant operating load; intermittent operating load; variable operating load; and seasonal operating load. At minimum, usage is characterized as being a member of either specified or unspecified operating hours.

The model is refined using actual data, and each end-use category becomes the summation of defined devices and their hours of operation. Unspecified operating hours are quantified as that required fully to account for all consumption within the end-use.

Specific predictions in energy conservation potential are then made by analyzing the performance characteristics of a proposed retrofit against the operating conditions of the existing device. The actual results of making a change in energy consuming equipment are quantified by calculating the difference in consumption before and after the retrofit.

Ultimate implementation of the desirable retrofit changes may accordingly be effected at the facility. The validity of this part of the process is then verified by repeating the bill analysis methodology for the after retrofit billing data of the current year. Any changes in electric consumption and demand not accounted for by the retrofit are subsequently identified and can be factored into the base year normalization procedure to maintain the accuracy of savings calculation.

The value of energy savings is calculated by normalizing the before retrofit billing data to current billing data period and weather conditions, using the equation developed for the total bill in the statistical analysis, and subtracting after retrofit billing data to identify the differential.

Figure 1B:
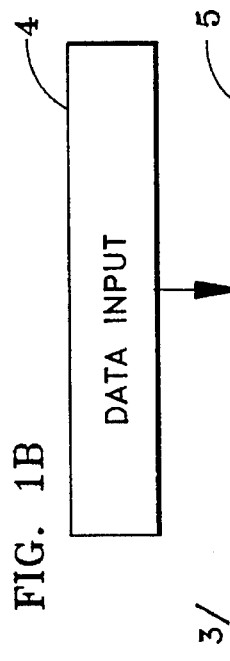
Figure 1A:
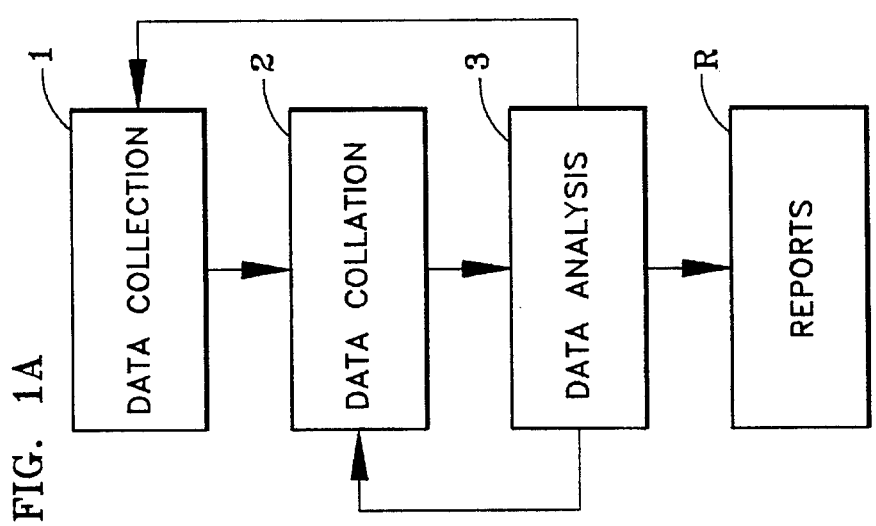
Figure 3A:
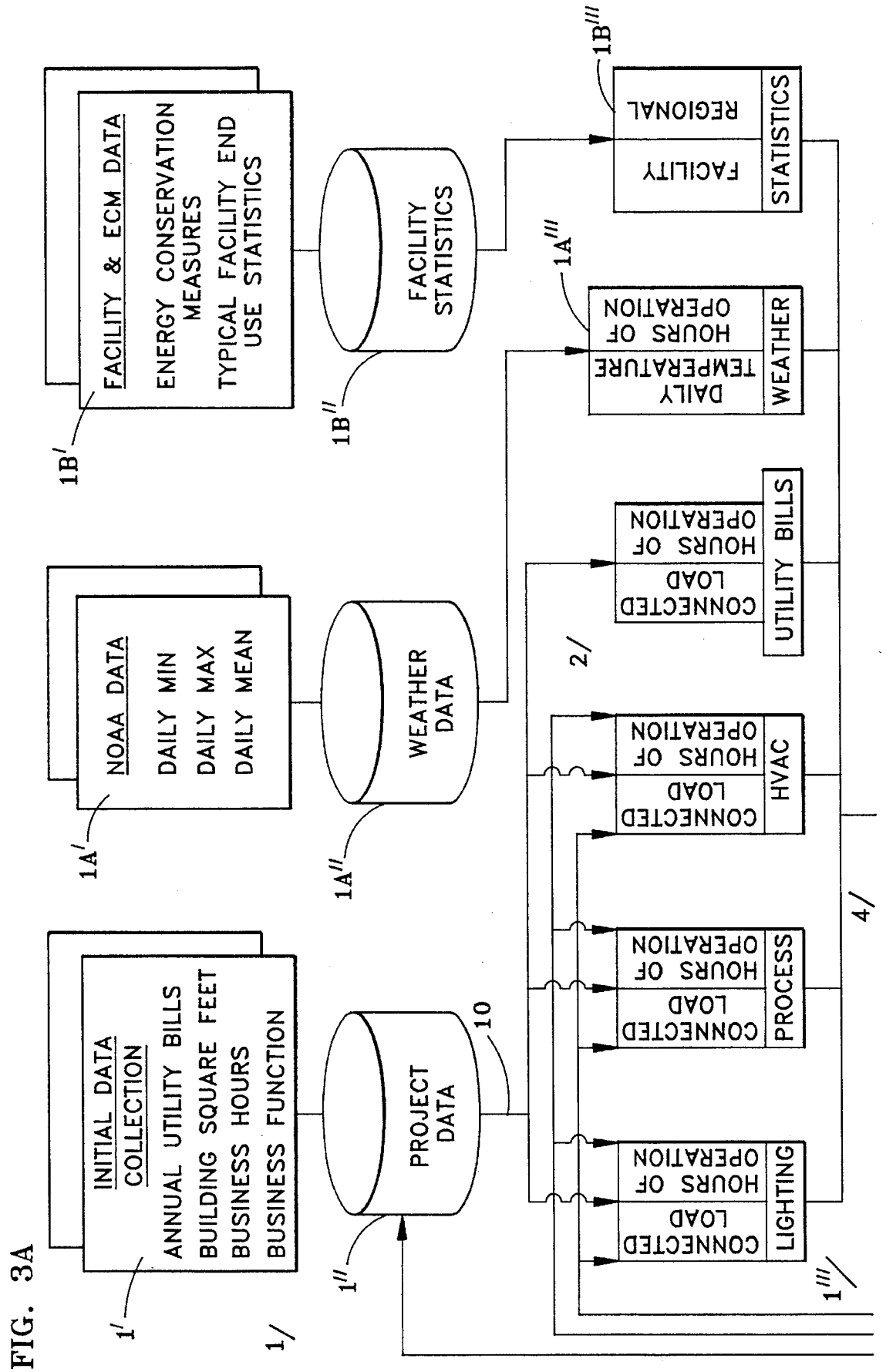
Figure 3B:
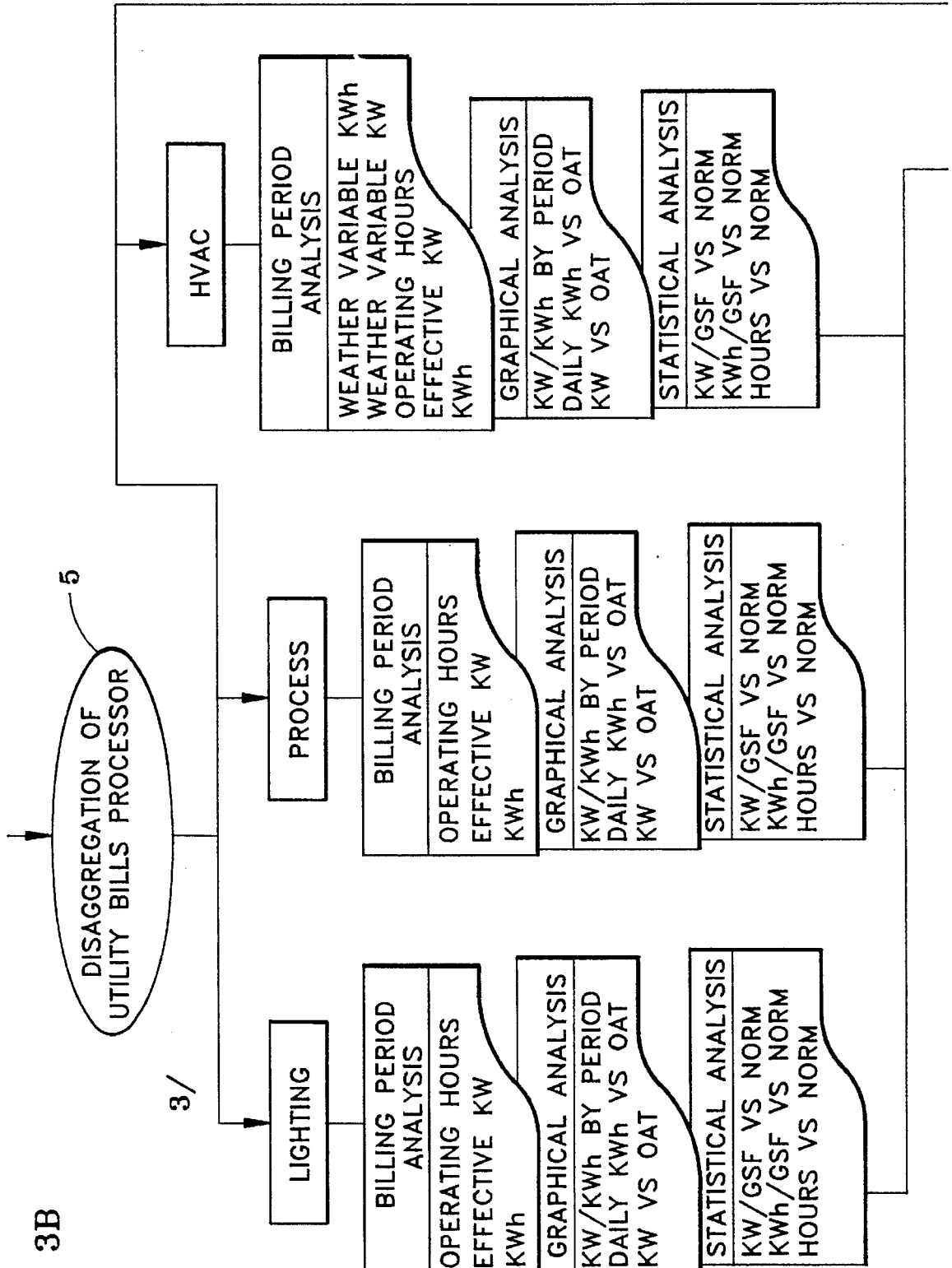
Figure 3C:
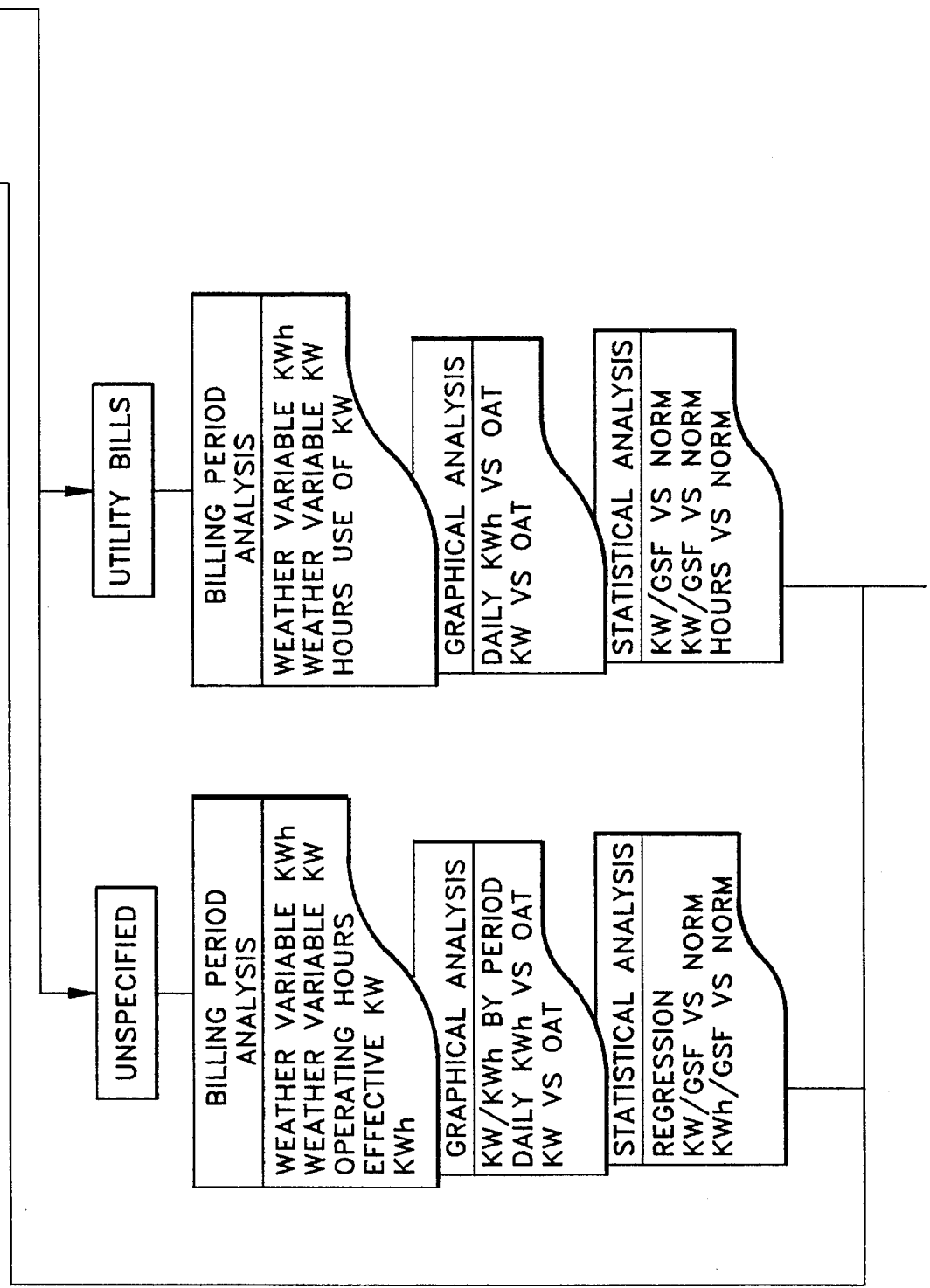
Figure 3D:
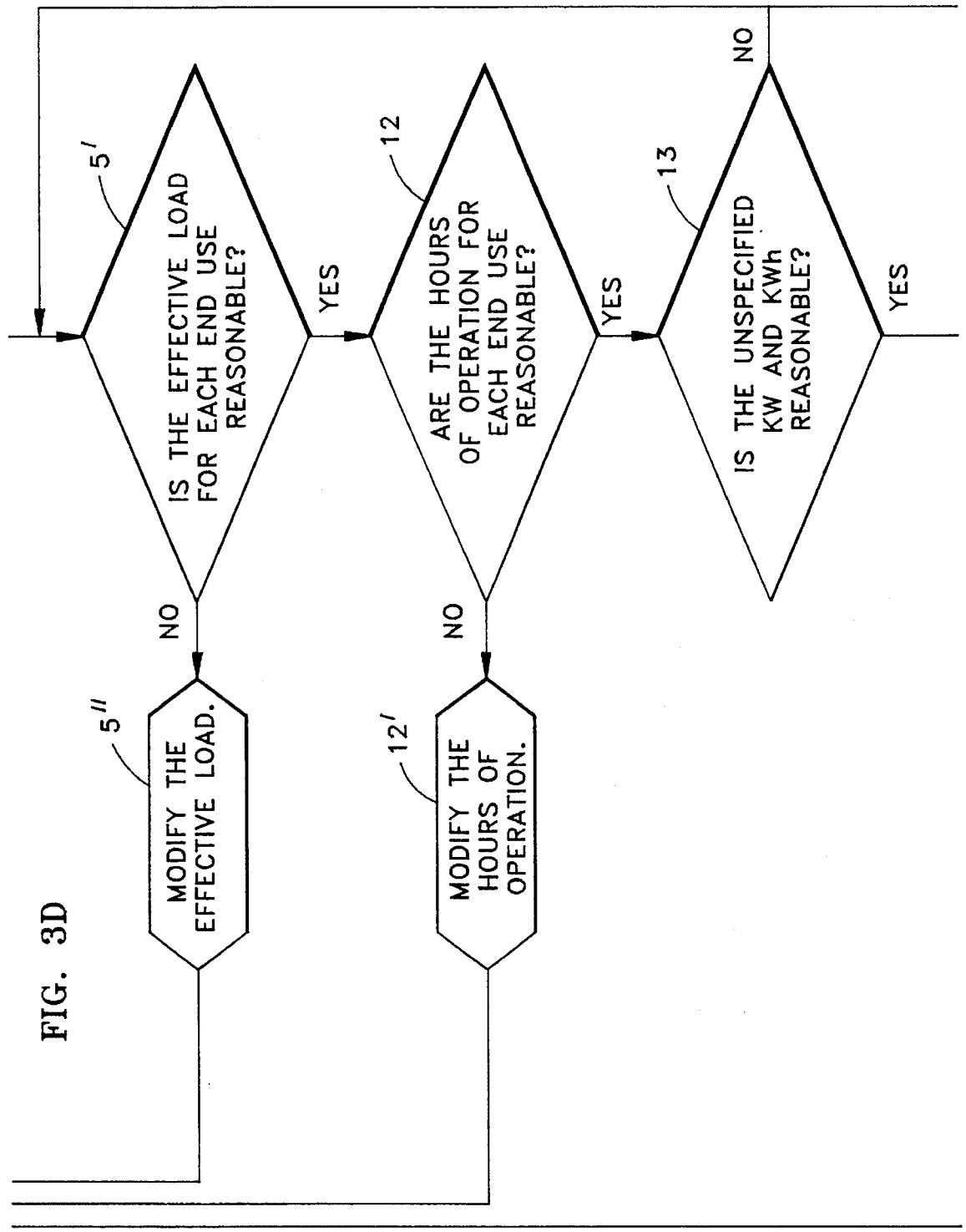
Figure 3E:
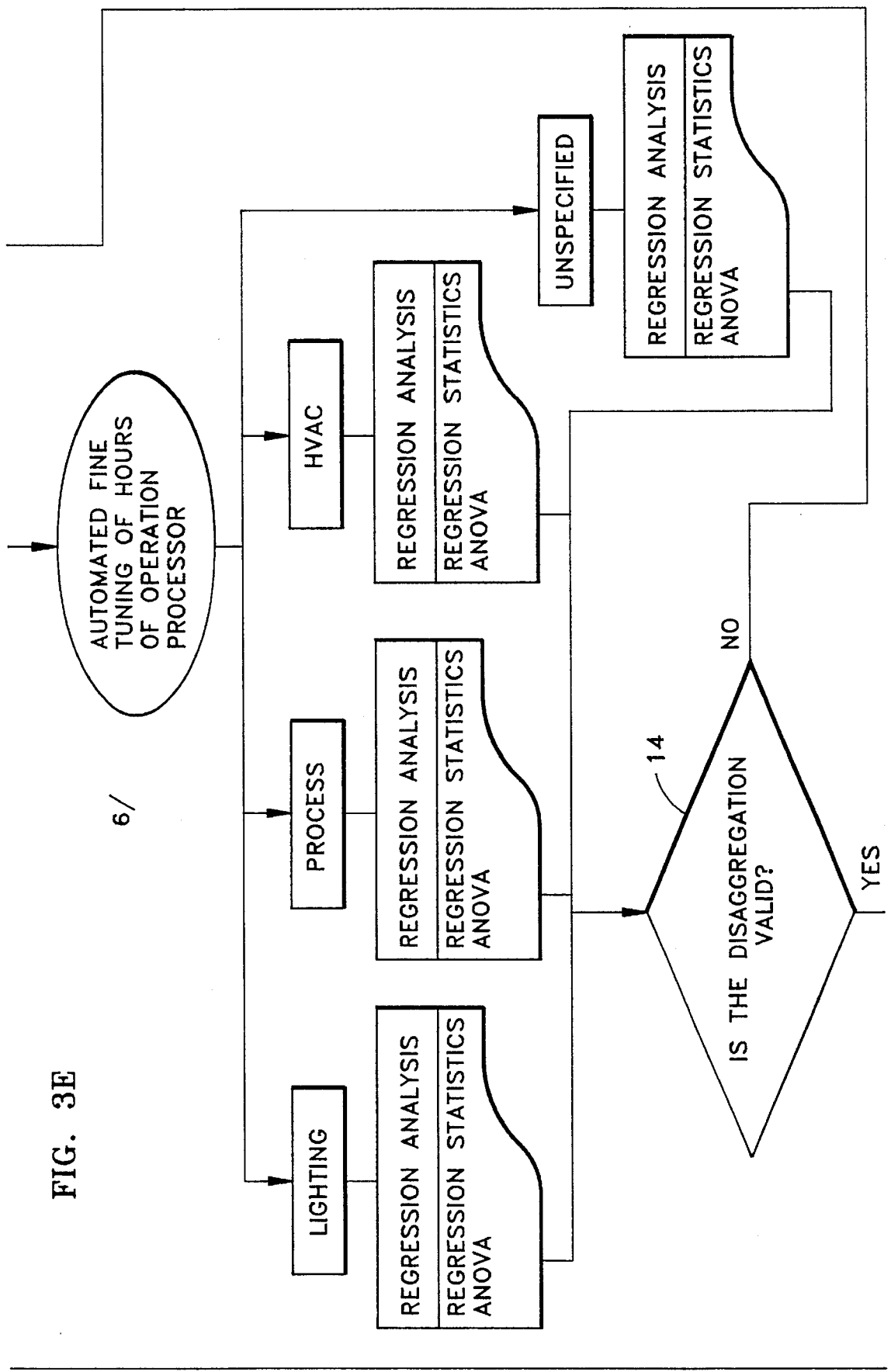
Figure 3F:
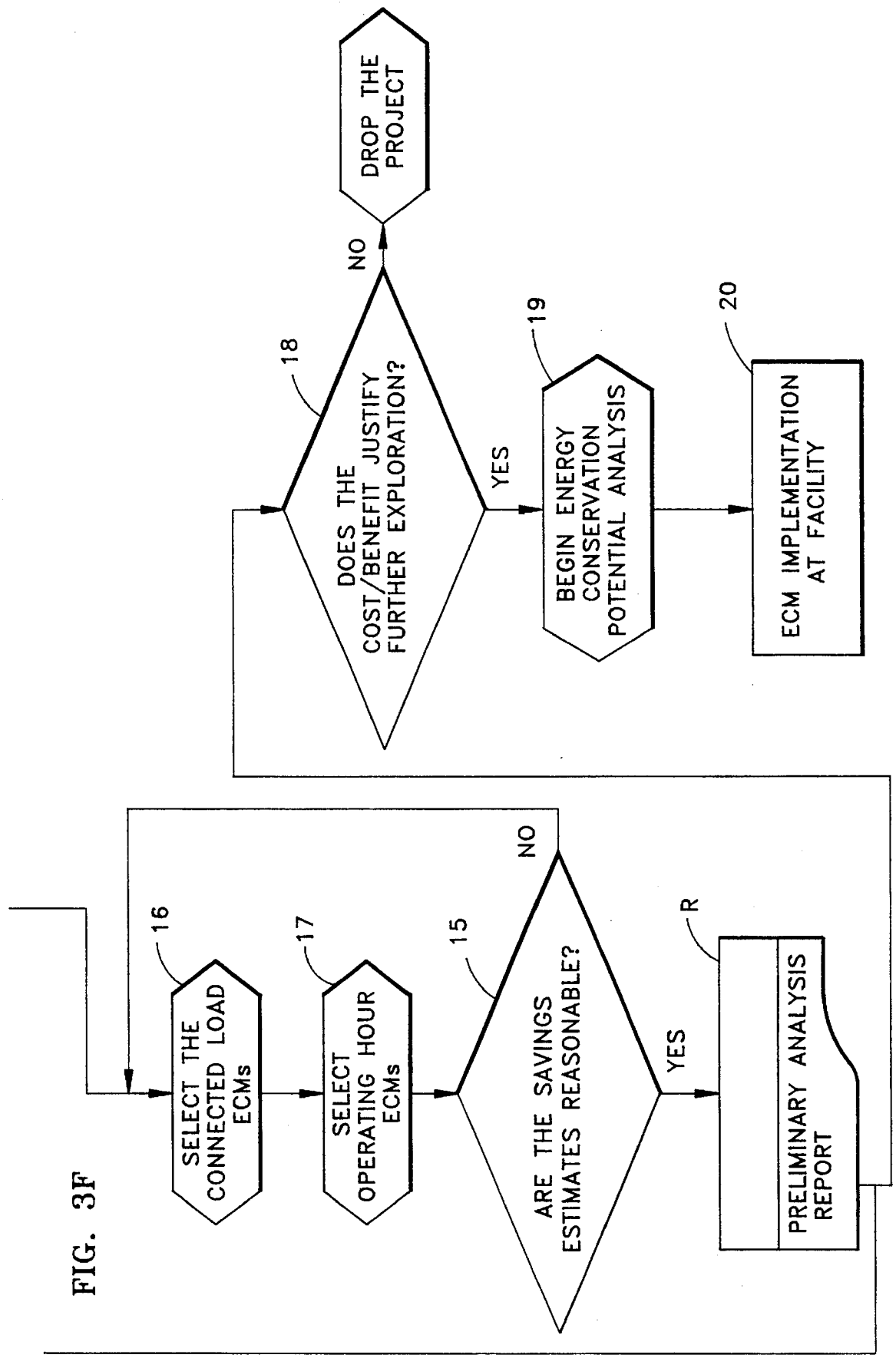

Referring first to the idealized block diagram of FIG. 1A, as before stated, because the process of the invention is designed to be capable of operation with minimum data for a facility (though obviously it can also operate with complete data if available), the process is reiterative. As data is collected at 1, it is recollated at 2 and re-analyzed at 3 with feedback to 1 and 2 as schematically shown in FIG. 1A. Increased data, of course will provide a greater level of certainty about the consumption of energy in the building.

As actual data for buildings is collected, in accordance with the expert systems portion of the process, the hypothesized disaggregation of a new building is refined more closely to approximate the population of real (known building survey) building data of comparable SIC code, KW per square foot and EWW.

Data Collection (at 1)

The data collection required at 1 is: (a) electric utility bills (KW and Kwh); (b) daily occupancy schedules; (c) government (NOAA) weather data; (d) building area; and (e) building use. Additional information includes electrical and mechanical systems inventories and building envelope and service area inventories.

The data is sufficient because building systems (lighting and HVAC) are designed according to standards. The EWW, hours use of peak demand per week, provides the descriptor for how these devices are used by current occupants.

The reason for the total sufficiency of the above data collection items resides in the realization, in accordance with the present invention, that the hours of use of peak demand per week is an excellent basis for estimating hours of use.

Data Collation (at 2)

Turning next to the data collation function schematically represented at 2, there are three requirements. First, peak demand must be disaggregated into the before-mentioned effective connected load or peak demand (ECLPD) for each of the lighting, power and HVAC use-dependent end-use categories.

The HVAC use-dependent consumption, as previously mentioned, is comprised of devices such as fans and pumps, which operate according to a fixed schedule. Air conditioning and heating devices, however, are temperature-dependent, since they operate in variation with the weather load. The HVAC end-use category defaults to the remainder of the peak demand for each bill. Default values for such ECRPO are thus established for the lighting, power and HVAC use-dependent end-use categories according to the building use on a watts per square foot basis.

Secondly, the hours of occupancy are expanded to hours of use by examining the electrical work week (EWW) hours of use of peak demand per week, or Kwh/KW, normalized to a 7-day period over 12 months of billing data.

The occupied and unoccupied percentage of operating in the schedule system is used to make this adjustment. A value approximating the EWW is thus selected when the facility is neither heating nor cooling. Such is then disaggregated for each of lighting, power and HVAC use-dependent end-use categories or components. The disaggregated hours of use for each of these end-use category defaults to a value which accounts for the remainder of the Kwh consumption for each bill. If desired, unspecified end-use category may be provided, which is a place holder for consumption and/or demand the modeler has not yet attributed. The process, however, will drive this end-use to zero. (Refinements to the hours of use according to end-use category are fed back from data analysis 3, as shown in FIG. 1A, being thereby incorporated into the original assumptions.)

Thirdly, as earlier stated, NOAA weather data, limited to the daily minimum and maximum temperature, is averaged for each day in the individual billing periods and averaged for the entire billing period (OAT). (For purposes of the before-mentioned polynomial part of the regression equation, OAT can also be squared or raised to additional powers.)

In addition, specific hours of operation which have been identified for the mechanical and electrical inventory of the facility, as well as their operating characteristics, are compiled according to end-use category. Non-specified hours of use and operating characteristics are then calculated to be equal to a value which accounts for the remainder of consumption and demand in the end-use category. The inventory and its characteristics are compiled according to defined service areas of the facility. As previously mentioned, moreover, if the bill provides peak and off-peak consumption data, the hours of use can be cross-correlated to the time periods as defined by the particular utility.

Data Analysis (at 3)

Unlike prior processes, as earlier discussed, the invention can operate with minimal facility data. This is totally unlike, for example, earlier building modelling methods requiring the construction of a precise description of the building, including even down to the level of defining small window recesses in order to calculate shading with the sun and the reduction of heat gain.

Earlier disaggregation processes using linear regression to establish a relationship with the weather required a nearly complete inventory of the facility before analysis could commence; and, it considered the annual bill and could not accurately match the monthly consumptions.

While there have been prior linear or polynomial regression equations developed to permit reconstruction of the bills, one or the other has been used for the limited purpose of calculating savings from one year to the next and, moreover, do not attempt to disaggregate the bill.

As before stated, the data analysis of the present invention, on the other hand, involves simultaneously disaggregating the bill while it develops an optimal set of statistics describing the monthly variations in billing data. Both a linear and polynomial regression equation are used, respectively, as previously explained, to accommodate the description of the hours of use components of the bill, and because the weather-consumption relationship is a curve. In addition to defining certain normative statistics which allow the user to determine proper bill disaggregation, the process of the invention can operate with only minimal facility data where required.

Figure 2:
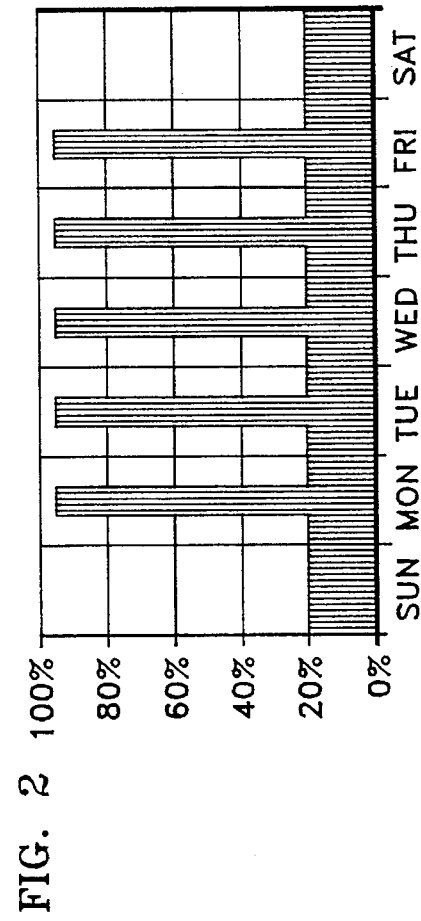

A core feature of the analysis processing is the development of a load shape for the before-mentioned effective connected load at peak demand (ECLPD), according to end-use. Referring to the chart of FIG. 2, such a load shape (square curve) is presented representing a weekly consumption—an 8 hour, 5 day per week occupied day. The tall bars represent usage during occupancy. The short bars were obtained by expanding the hours of use to correspond with the EWW as before discussed. An important feature of this process is the use of the regression analysis to optimize the assumptions or predictions as to this load shape according to what has happened at the facility. In short, the original assumptions are modified as to hours of use, within a fixed margin, to develop a regression equation with high correlation and minimal monthly residuals. If, as before pointed out, more than one time period is described by the utility bill (such as peak and off-peak hours of consumption) then the analysis is performed for each time period. With the before-mentioned refined operating schedule data entry, furthermore, it is now possible to use a single schedule to produce the appropriate load shapes for multiple time period billing systems.

The steps in this process within the data analysis block of FIG. 1A are shown in FIG. 1B, as follows:

(1) The collated data from the previous step is inputted at 4, FIG. 1B, (2) The KW and Kwh are disaggregated by end-use at 5. Any consumption and demand which was specified in the Data Collation step 2 of the whole process is applied to its end-use category. The remaining ECLPD and hours of use are calculated for the end-use. Preferably the ECLPD may be altered for each end-use, being adjustable across all billing months. Such events may occur in many facilities, such as a school which is partially shut down for the summer, In addition, the capability to modify the hours of use for any end-use for any month is provided. Definitive reasons, based upon the actual usage of the facility, are documented to explain why any modifications were made from the original estimates.

Several clues are presented as to how to perform these changes, if necessary, by the statistical norms for a particular facility type. In addition, the hours of use and ECLPD for the HVAC end-use highlight any errors which may be introduced through this step in the analysis methodology. For example, if sufficient demand or too much demand has been attributed for one of the other end-uses, then there will be inadequate power left over to operate the HVAC end-use. The same logic occurs with the hours of use. Bad assumptions in the other end-uses show up as inadequate or overly generous run times for the HVAC end-use. Obviously, there cannot be an end-use category which has more hours of use then are available in a week.

(3) The usage and temperature components are then optimized at 6. After establishing the hours of use for each end-use category, the regression model is used to optimize the predictions or assumptions. Two regression analyses are performed. The first analysis looks at the total bill and regresses on a polynomial of OAT (to account for the temperature-dependent consumption) and lighting hours of use as well as power hours of use (to account for the usage-dependent portion of each bill) and HVAC use-dependent hours of use. The second analysis looks at the disaggregated HVAC portion of the bill and regresses on the same temperature-dependent factors, but only the HVAC use-dependent hours of use (which define the hours of use for the facility).

Optimization occurs by adjusting the monthly hours of use for lighting power and HVAC use-dependent applications within margins defined as acceptable variations (perhaps +/−5% for lighting and HVAC, and +/−10% for power). This is accomplished automatically using conventional linear programming techniques. The result is that the monthly residuals are driven to a minimum for both the total bill and its HVAC component, while the $r^2$ confidence factor is maximized.

(4) The analysis results are accepted at 7, FIG. 1B, after disaggregating and optimizing are repeated until a satisfactory representation of actual conditions at the facility is attained. The results of the analysis are then fed back into the Data Collation step 2 of the process, FIG. 1A, so that it may be stored, and used.

The final reporting step in the process, shown in FIG. 1A, bears upon supplying management information. This is constructed from the data collected and developed in the process and, by implementing the indicated changes, management may achieve energy conservation results.

Some example reports are as follows:

| REPORT TYPE | FUNCTION/USE |
| --- | --- |
| Consumption by End-Use | Identifies excessive hours of operation in order to identify a means to curb the energy abuse. The steps taken could be as simple as reminding people to shut off lights or to monitor the habits of cleaning crews. |
| Energy Conservation Retrofit Analysis | Identifies the savings potential of modifying or replacing existing devices to achieve efficiency. Allows the user to identify the most cost effective alternatives. |
| Year-to-Year Comparisons | Identifies changes in the operation of a facility which effects the temperature and usage factors of a bill. Isolates patterns which were temporary changes as well as permanent alteration to a building's energy curve. |
| Monthly Energy Savings Verification | Calculates the monthly effect of changes which were made to a facility by establishing a base year and comparing current year consumption and demand. The base year is normalized to current year conditions according to the regression equation for the total bill. |
| Annual Energy Savings Reconciliation | Identifies changes in the operation of end-uses or devices which were not part of an energy conservation retrofit, allowing these changes to be factored out of the Monthly Energy Savings Verification. |
| Energy Consumption by Space Use | Allows energy consumption to be distributed to specific accounting categories. For example, in Massachusetts, a 5% sales tax is charged for non-manufacturing uses of energy. This report would allow accurate definition of what portions of an electric bill were subject to a sales tax. Another example of how it might be used is when energy costs can be recovered from a research grant. Typically, at a college, the areas devoted to research use more energy than classrooms and dormitories. The other allowable method provides a charge based upon the portion of building area used for research, leaving considerable monies unrecovered. |

The following is a series of tables illustrating data collations from billing, weather and ancillary information, as earlier discussed, in accordance with the process of the present invention.

Table 1, below, presents input and output data from utility bills for a 12-month period from December through November for peak usage, tabulating average OAT and $OAT^2$ information, maximum and minimum limit base and process hours and a lighting, power and process load summary.

TABLE 1

Data Input and Output

| Month | Billing Dates From | Billing Dates To | Peak Usage | Shoulder Usage | Off Peak Usage | Peak KW Demand | Total Cost | Pk Eff Hours | 9 Eff Hours | OP Eff Hours | Avg OAT | Avg OAT² | Cnctd Load | EWW |
|---|---|---|---|---|---|---|---|---|---|---|---|---|---|---|
| DEC | 11/23/88 | 12/23/88 | 393079 | | | 845.1 | 27516 | 426 | | | 34.9 | 1219 | 0 | 108.5 |
| JAN | 12/23/88 | 1/24/89 | 385123 | | | 795.2 | 26959 | 453 | | | 33.5 | 1122 | 0 | 105.9 |
| FEB | 1/24/89 | 2/22/89 | 367413 | | | 828.9 | 25719 | 435 | | | 33.2 | 1105 | 0 | 107.0 |
| MAR | 2/22/89 | 3/23/89 | 365861 | | | 855.6 | 25610 | 435 | | | 32.5 | 1057 | 0 | 103.2 |
| APR | 3/23/89 | 4/24/89 | 375452 | | | 822.6 | 26282 | 468 | | | 45.1 | 2033 | 0 | 99.8 |
| MAY | 4/24/89 | 5/23/89 | 357124 | | | 1040.4 | 24999 | 435 | | | 55.9 | 3124 | 0 | 82.9 |
| JUN | 5/23/89 | 6/22/89 | 414487 | | | 1267.2 | 29014 | 453 | | | 65.6 | 4307 | 0 | 78.3 |
| JUL | 6/22/89 | 7/25/89 | 499719 | | | 1335.6 | 34980 | 465 | | | 71.9 | 5173 | 0 | 79.4 |
| AUG | 7/25/89 | 8/24/89 | 459828 | | | 1290.6 | 32188 | 453 | | | 73.6 | 5421 | 0 | 83.1 |
| SEP | 8/24/89 | 9/25/89 | 427945 | | | 1274.4 | 29956 | 458 | | | 66.7 | 4452 | 0 | 73.5 |
| OCT | 9/25/89 | 10/25/89 | 342532 | | | 905.4 | 23977 | 453 | | | 54.4 | 2955 | 0 | 88.3 |
| NOV | 10/25/89 | 11/24/89 | 339716 | | | 881.1 | 23780 | 437 | | | 48.2 | 2322 | 0 | 90.0 |

Occupied hour parameters for solver

| Base Hours Mult | Maximum Limit 0.0500 | Minimum Limit -5% | Process Hours Mult | Maximum Limit 0.1000 | Minimum Limit -10% |
|---|---|---|---|---|---|
| 1.00 | 447.30 | 404.70 | 1.00 | 468.60 | 383.40 |
| 1.00 | 475.65 | 430.35 | 1.00 | 498.30 | 407.70 |
| 1.00 | 456.75 | 413.25 | 1.00 | 478.80 | 391.50 |
| 1.00 | 456.75 | 413.25 | 1.00 | 478.50 | 391.50 |
| 1.00 | 491.40 | 444.60 | 1.00 | 514.80 | 421.20 |
| 1.00 | 456.75 | 413.25 | 1.00 | 478.50 | 391.50 |
| 1.00 | 475.65 | 430.35 | 1.00 | 498.30 | 407.70 |
| 1.00 | 488.25 | 441.75 | 1.00 | 511.50 | 418.50 |
| 1.00 | 475.65 | 430.35 | 1.00 | 498.30 | 407.70 |
| 1.00 | 480.90 | 435.10 | 1.00 | 503.80 | 412.20 |
| 1.00 | 475.65 | 430.35 | 1.00 | 498.30 | 407.70 |
| 1.00 | 458.85 | 416.15 | 1.00 | 480.70 | 393.30 |

| | Cnctd Load | Effctv Load |
|---|---|---|
| Lighting | 315.0 | 292.5 |
| Power | 80.0 | 50.0 |
| Process | 275.0 | 275.0 |
| GSF | 195000 | |

Figure 4B:
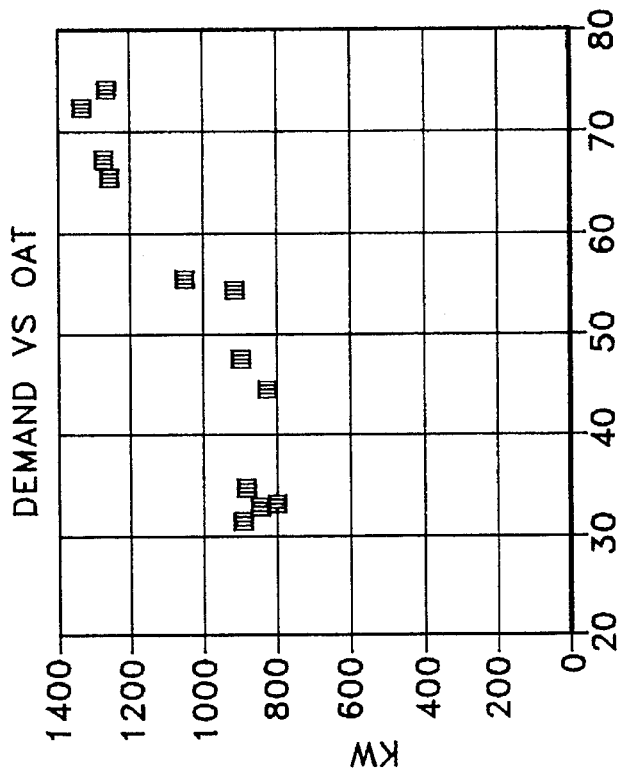
FIGS. 4A and 4B are plots of Kwh versus outside average temperature (OAT) and KW demand versus OAT, respectively, taken from the data of Table 1 presented herein tabulating exemplary data input and output obtained from billing data for peak, shoulder and off-peak power consumption of lighting, power and process functions in a typical facility.
Figure 4A:
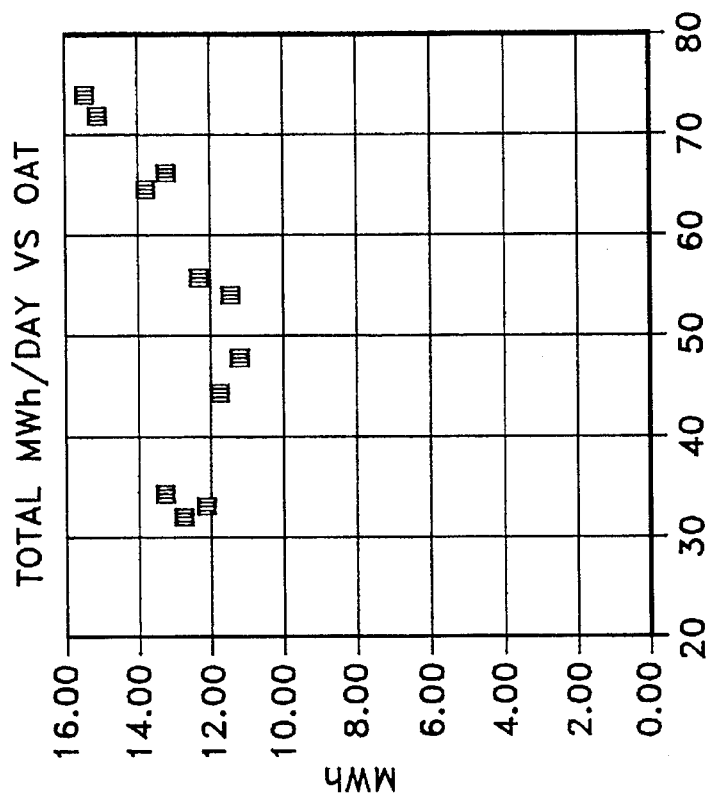

The total Kwh/Day Kwh consumptions is plotted along the ordinate in FIG. 4A as a function of average OAT along the abscissa; and KW demand is similarly plotted in FIG. 4B for the illustrative data of Table 1.

In Table 2, the disaggregation for each of lighting, power, process and HVAC end-use are presented.

represent HVAC, and the open diamond symbols identified as "ltg" represent lighting. In FIG. 5B, similar curves taken from the data of Table 2 is presented for KW by month for each such end-use.

A statistical analysis of the billing factors, showing error margins, the data from the OAT and $OAT^2$ regression

TABLE 2

Total Demand and Consumption Disaggregated by End-Use

|     | Kwh Lighting | KW Lighting | EWW Lighting | Ltg/Pwr Kwh Mult | Ltg/Pwr KW Mult | Kwh Process | KW Process | EWW Process | Process Kwh Mult | Process KW Mult |
| --- | --- | --- | --- | --- | --- | --- | --- | --- | --- | --- |
| DEC | 130,832 | 292.5 | 104.37 | 1.0000 | 1.0000 | 117,330 | 275.0 | 99.55 | 1.0000 | 1.0000 |
| JAN | 130,507 | 292.5 | 97.60 | 1.0000 | 1.0000 | 124,555 | 275.0 | 99.08 | 1.0000 | 1.0000 |
| FEB | 130,275 | 292.5 | 107.51 | 1.0000 | 1.0000 | 119,556 | 275.0 | 104.94 | 1.0000 | 1.0000 |
| MAR | 130,201 | 292.5 | 107.45 | 1.0000 | 1.0000 | 119,554 | 275.0 | 104.94 | 1.0000 | 1.0000 |
| APR | 130,809 | 292.5 | 97.83 | 1.0000 | 1.0000 | 128,742 | 275.0 | 102.41 | 1.0000 | 1.0000 |
| MAY | 130,477 | 292.5 | 107.67 | 1.0000 | 1.0000 | 119,582 | 275.0 | 104.96 | 1.0000 | 1.0000 |
| JUN | 130,527 | 292.5 | 104.12 | 1.0000 | 1.0000 | 124,574 | 275.0 | 105.70 | 1.0000 | 1.0000 |
| JUL | 130,976 | 292.5 | 94.98 | 1.0000 | 1.0000 | 127,898 | 275.0 | 98.65 | 1.0000 | 1.0000 |
| AUG | 130,206 | 292.5 | 103.87 | 1.0000 | 1.0000 | 124,661 | 275.0 | 105.69 | 1.0000 | 1.0000 |
| SEP | 130,588 | 292.5 | 97.66 | 1.0000 | 1.0000 | 125,961 | 275.0 | 100.20 | 1.0000 | 1.0000 |
| OCT | 130,270 | 292.5 | 103.92 | 1.0000 | 1.0000 | 124,580 | 275.0 | 105.70 | 1.0000 | 1.0000 |
| NOV | 130,425 | 292.5 | 104.04 | 1.0000 | 1.0000 | 120,134 | 275.0 | 101.93 | 1.0000 | 1.0000 |
| Sum | 1,566,093 | WSF | Avg H/W |  |  | 1,477,027 | WSF | Avg H/W |  |  |
| % | 33.12% | 1.50 | 102.59 |  |  | 31.24% | 1.41 | 102.81 |  |  |

|     | Kwh Power | KW Power | EWW Power |  |  | Kwh HVAC | KW HVAC | EWW HVAC |  |  |
| --- | --- | --- | --- | --- | --- | --- | --- | --- | --- | --- |
| DEC | 22,385 | 50.0 | 104.37 |  |  | 122,552 | 227.6 | 125.64 |  |  |
| JAN | 22,309 | 50.0 | 97.60 |  |  | 107,752 | 177.7 | 132.64 |  |  |
| FEB | 22,269 | 50.0 | 107.51 |  |  | 95,313 | 211.4 | 108.83 |  |  |
| MAR | 22,257 | 50.0 | 107.45 |  |  | 93,849 | 238.4 | 95.02 |  |  |
| APR | 22,360 | 50.0 | 97.83 |  |  | 93,541 | 205.1 | 99.77 |  |  |
| MAY | 22,304 | 50.0 | 107.67 |  |  | 84,761 | 422.9 | 48.38 |  |  |
| JUN | 22,312 | 50.0 | 104.12 |  |  | 137,074 | 649.7 | 49.23 |  |  |
| JUL | 22,389 | 50.0 | 94.98 |  |  | 218,456 | 716.1 | 64.53 |  |  |
| AUG | 22,257 | 50.0 | 103.87 |  |  | 182,804 | 673.1 | 63.37 |  |  |
| SEP | 22,323 | 50.0 | 97.66 |  |  | 149,073 | 656.9 | 49.64 |  |  |
| OCT | 22,268 | 50.0 | 103.92 |  |  | 65,414 | 287.9 | 53.02 |  |  |
| NOV | 22,295 | 50.0 | 104.04 |  |  | 66,862 | 263.6 | 59.18 |  |  |
| Sum | 267,708 | WSF | Avg H/W |  |  | 1,417,451 | Avg WSF | Avg H/W | Max WSF | Min WSF |
| % | 5.66% | 0.26 | 102.59 |  |  | 29.98% | 2.02 | 79.10 | 3.68 | 0.91 |

Figure 5A:
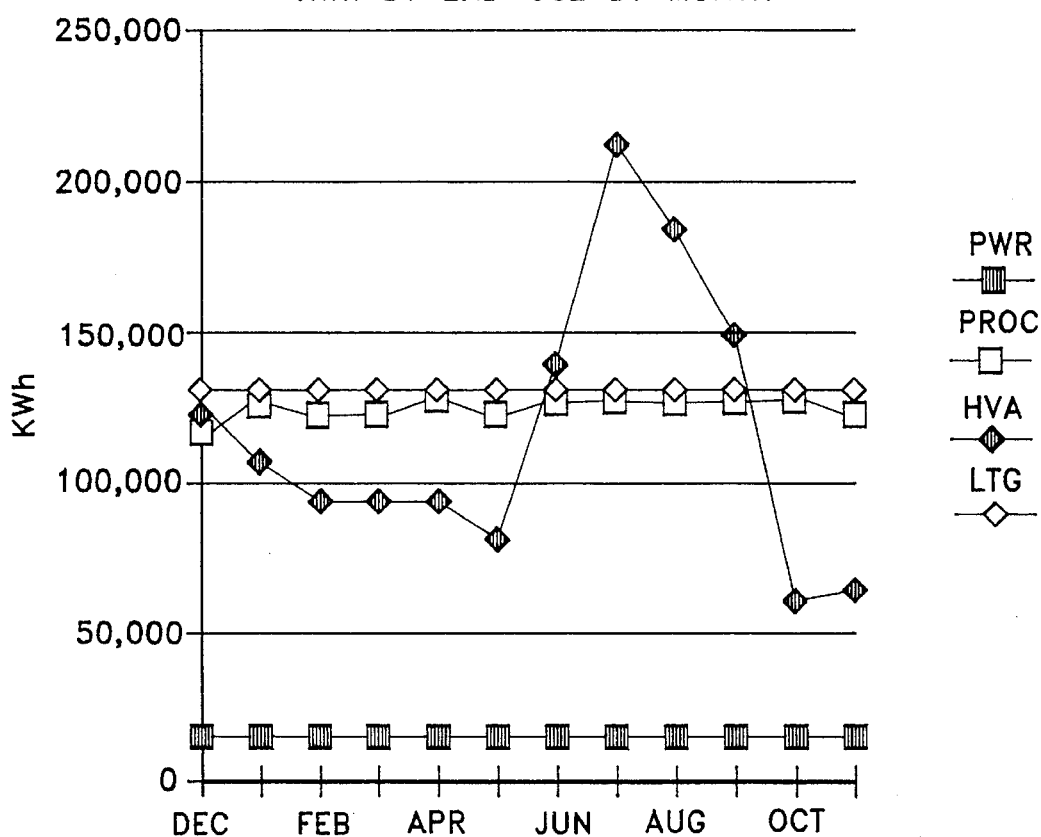
FIGS. 5A and 5B are graphs of Kwh by end-use by month and KW by end-use by month, respectively, from the data of later-presented Table 2, an example of total demand and consumption disaggregated by end-use for a facility, showing tabulations for each of lighting, (power/process) and HVAC (fans, pumps, cooling, heating)
Figure 5B:
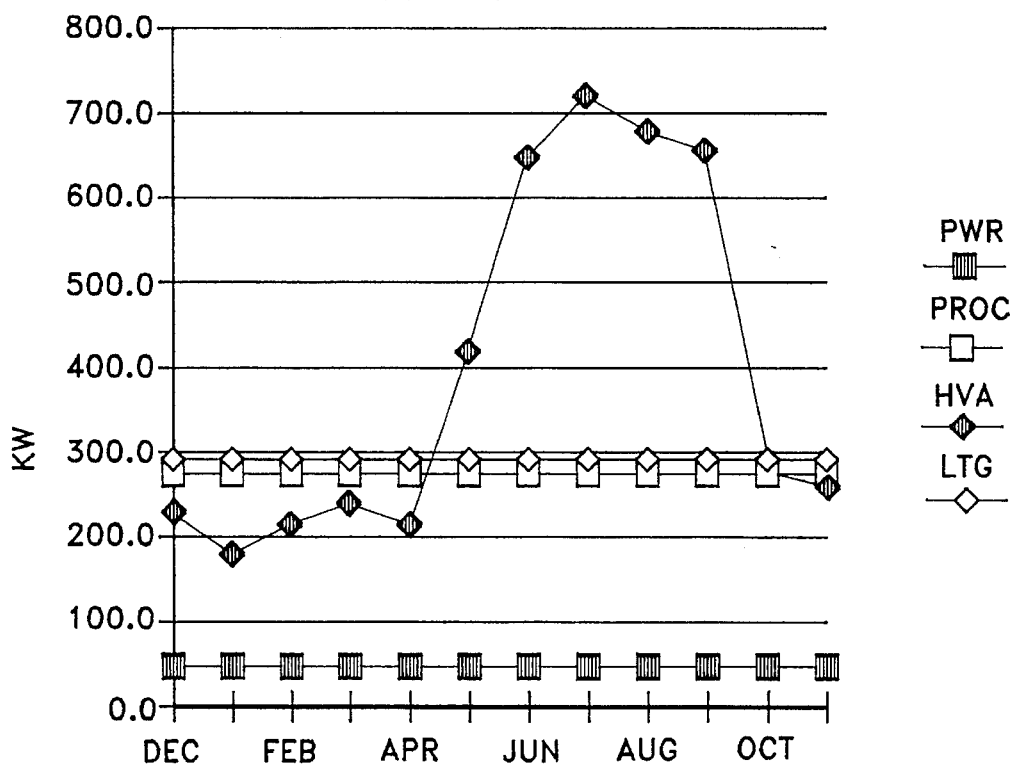

FIG. 5A plots the Kwh consumption by month for each of such end-uses with the legend of the graph lines thereabove. The solid square symbols identified as "Pwr" represent power, the open square symbols identified as "Proc" represent process, the solid diamond symbols identified as "HVA"

equation analyses, leading to the basic and process adjustment and the before-described HVAC use residuals are presented in Table 3.

TABLE 3

Statistical Analysis of Billing Factors

| Total | 4 | 3 | 2 | 1 | constant |  | 0 | Annual Error |  |
| --- | --- | --- | --- | --- | --- | --- | --- | --- | --- |
| factors | 278.75 | 19754.96 | 187.50 | −17734.92 | −8171145.41 |  | 0.62% | Maximum Error (Total) |  |
| std error | 14.18 | 182.61 | 0.87 | 91.28 | 79469.57 |  |  |  |  |
| r' 2/y err | 99.99% | 493.54 | #N/A | #N/A | #N/A |  |  |  |  |
| f-val/df | 2.66E + 04 | 7 | #N/A | #N/A | #N/A |  |  | Combined r' 2 + Residual | 2.018048880 |
| SS/res | 2.60E + 10 | 1.71E + 06 | #N/A | #N/A | #N/A |  |  |  |  |
| HVAC | 3 | 2 | 1 | constant |  |  |  |  |  |
| factors | 19426.75 | 187.50 | −17733.27 | −8176820.63 |  |  |  |  |  |
| std error | 161.32 | 0.82 | 85.57 | 71827.56 |  |  |  |  |  |
| r' 2/y err | 99.99% | 463.78 | #N/A | #N/A |  |  |  |  |  |
| f-val/df | 3.71E + 04 | 8 | #N/A | #N/A |  |  |  |  |  |
| SS/res | 2.39E + 10 | 1.72E + 06 | #N/A | #N/A |  |  |  |  |  |

TABLE 3-continued

Statistical Analysis of Billing Factors

Data for Multiple Regression Analysis

| Month | Average OAT 1 | Average OAT² 2 | Ltg/Pwr Hrs In Bill 3 | Process Hrs In Bill 4 | Electric Use Y | Electric Use Residual | HVAC Use Residual | Basic Adjust by Solver | Process Adjust by Solver |
|---|---|---|---|---|---|---|---|---|---|
| DEC | 34.9 | 1,219 | 447.29 | 426.66 | 393,079 | 524 | 594 | 105.00% | 100.15% |
| JAN | 33.5 | 1,122 | 446.18 | 452.93 | 385,123 | 482 | 432 | 98.49% | 99.98% |
| FEB | 33.2 | 1,105 | 445.38 | 434.75 | 367,413 | −436 | −431 | 102.39% | 99.94% |
| MAR | 32.5 | 1,057 | 445.13 | 434.74 | 365,861 | −440 | −440 | 102.33% | 99.94% |
| APR | 45.1 | 2,033 | 447.21 | 466.15 | 375,452 | −145 | −216 | 95.56% | 100.03% |
| MAY | 55.9 | 3,124 | 446.08 | 434.84 | 357,124 | −465 | −411 | 102.55% | 99.96% |
| JUN | 65.6 | 4,307 | 446.25 | 453.00 | 414,487 | 380 | 365 | 98.51% | 100.00% |
| JUL | 71.9 | 5,173 | 447.78 | 465.08 | 499,719 | −553 | −558 | 96.30% | 100.02% |
| AUG | 73.6 | 5,421 | 445.15 | 452.95 | 459,828 | 310 | 310 | 98.27% | 99.99% |
| SEP | 66.7 | 4,452 | 446.45 | 458.04 | 427,945 | 106 | 98 | 97.48% | 100.01% |
| OCT | 54.4 | 2,955 | 445.37 | 463.02 | 342,532 | 120 | 91 | 98.32% | 100.00% |
| NOV | 48.2 | 3,322 | 445.90 | 436.85 | 339,716 | 138 | 168 | 102.04% | 99.97% |

FIGS. 6A and 6B respectively plot Kwh HVAC usage per hour as a function of OAT and the total bill and HVAC residuals as a function of OAT, respectively.

It now remains to discuss in detail the microprocessor-implementable processing for effecting the various process steps earlier delineated, and in connection with the flow diagram of FIG. 3. This diagram commences at the top with the data collection of FIG. 1A, implemented by initial data collection 1' of annual utility bills (Table 1), building or facility square footage, business hours and business functions as earlier explained—such resulting in the totality of Project Data 1". The NOAA weather data collected at 1—daily minimum and maximum temperatures to complete the average or mean, Table 1—is indicated at 1A' and constitutes the required weather data at 1A". Similarly, the facility end-use and energy conservation (ECM) measures collected at 1B' provide the necessary facility statistics at 2B".

The project data at 1" is shown presented along common path 10 to each of lighting, process, HVAC and utility bills blocks, so-labelled along horizontal line 1'''; with weather data provided at "Weather", 1A''', and facility statistics, based on predicted or assumed situations, provided at "Statistics", 1B'''. These data inputs continue and grow across multiple projects and are placed in computer storage. This is where the 'expert system' of the invention comes into play. Because the modeling system has developed a set of descriptive statistics regarding the connected load, by end-use, for the building, and because the process has developed the EWW and statistics about peak demand per square foot (which correlates to engineering design), when combined with the SIC, various sets can be constructed within the building population which allow accurate prediction of how a new building is constructed and performs.

These stored data are now ready for accessing for disaggregation for the separate end-use in the Disaggregation of Utility Bills Processor at 5. The purpose of this processor is to quantify the relationship of the bill to the end-use which are served. Analysis (operating hours, effective KW, Kwh) Graphical Analysis (KW/Kwh by period, daily Kwh vs. OAT and KW vs. OAT—FIGS. 4A and 4B), and Statistical Analysis (KW/GSF vs. Norm Kwh/GSF vs. Norm and Hours vs. Norm) is effected in the data analysis section 3 for lighting/process. In the HVAC Billing Period Analysis, weather variable Kwh and KW, operating hours and effective KW and Kwh are involved, as indicated—FIGS. 5A and 5B. For the unspecified, similar Billing Period Analysis is provided; and the Statistical Analysis involves also the Regression computation before explained—Table 3, FIGS. 1A and 6B, with the residuals tabulated in Table 3 appearing in the balance of the Billing Period Analysis (under the Utility Bills block). Statistics about the unspecified consumption are used to determine in which end-use category they properly belong. The net result of the disaggregation is to distribute all consumption out of the unspecified. The way consumption got into the unspecified end-use is that original estimates of consumption (or demand) were not on target. Unspecified consumption, by the way, under this means can start out as a negative number.

Such disaggregation of the utility bill information for the various end-use is then reviewed at 5' to verify if the effective load for each end-use is reasonable, as indicated in the earlier predictions or assumptions. If not (path "no"), the effective load is modified at 5" and fed back to the respective "Connected Load" inputs of the lighting, process and HVAC data blocks in line 1'''. If reasonable (path "Yes"), on the other hand, it is next verified at 12 that the hours of operation for each end-use are reasonable. If not (path "No"), the hours of operation are modified or changed at 12', and fed back to the "Hours of Operation" inputs of the lighting, process and HVAC data blocks. If reasonable (path "Yes"), on the other hand, it is next verified at 13 that the unspecified KW and Kwh earlier discussed, are reasonable. If not (path "No"), corrective feedback to the disaggregation output of all end-use is effected—then to reiterate the verifications at 5', 12 and 13. With reasonable unspecified KW and Kwh (path "Yes"), optimizing usage 6 is engaged by processor automated fine tuning of the hours of operation for each of the lighting, process, HVAC and unspecified categories. Hours of use for the latter, as before explained, are not developed, but are distributed to other end-uses.

In addition, as previously explained, the HVAC end-use consists of two components: the temperature-dependent, and the use-dependent. These are handled quite differently. Use-dependent follows the same rules as for lighting and power. Temperature-dependent consumption is the remainder after all use-dependent end-uses are estimated. When temperature-dependent does not equal or closely approach zero for at least one month (which are typically in the spring and fall when OAT is between 45 and 60 degrees), that consumption is placed into unspecified.

There follows the review as to whether the disaggregation is valid at 14. Unless such proves not to be valid ("No"), in which event there is again feedback to the disaggregation output of all end-uses, the process proceeds serially to select connected load energy conservation measured (ECMs) at 16, select operating hour ECMs at 17, and to review at 15 whether savings estimates by the analysis are reasonable. If not ("No"), feedback to change the selections is provided: if so ("Yes"), a preliminary analysis report R is provided—such being made available at the input Project Data section 1". Analysis is then made at 18 to decide whether cost/benefit exploration is justified. If not ("No"), the project is dropped; but if conservation improvement may be justified ("Yes"), potential energy conservation analysis is undertaken.

In summary, therefore, the above reiterative steps, with the operator in the process required to take an active part, thus enable such operator to visualize the estimates which are made concerning the end-uses of the electricity. The purpose is to transfer as much consumption and demand out of the unknown area and into a specific end-use. When, indeed, the operator believes that an adequate end-use consumption pattern has been described, the before-described Automated Fine Tuning of Hours of Operation Processor is invoked. The key factor is that the pattern model uses multiple months of electric bills which appear to be varying—the process attempting to describe those variations and provide a linear equation which accurately reconstructs the bills from the end-use predictions or assumptions.

When the disaggregation is deemed valid, thus, the operator selects (16, 17) various energy conservation measures which are predicted as usefully applicable to the building. The key problem solved by this modeling process is establishing effective load and hours of operation. Having reasonable estimates of these factors means that the savings calculations, which are the same as calculating existing consumption, except looking at the differential change, will be reasonable.

The end result is that a report is printed (R) which allows management to make a decision based on predicated consumption ameliorating implementation—schematically represented by the block "ECM" "Implementation at Facility", 20 in FIG. 3. Prior to such, where appropriate and during Energy Conservation Potential Analysis 19, there may be added to the data a site survey and inventory of mechanical and electrical equipment in the facility; and a step of further Energy Savings Verification may be employed, wherein a further dimension is added to bill disaggregation—comparisons of before and after proposed retrofit energy consumption.

Considering the earlier set of illustrative report types, the implementation at 20 may range from shutting off specific lights, to modifying or replacing particular existing devices in the facility to achieve greater efficiency, or even changing uses of different portions of the building. Once the changes have been implemented in the facility, the savings may, of course, be compared with operation before retrofit and verified.

Summarizing, as previously mentioned, in preferred form, the invention employs disaggregation categories of lighting, process, HVAC and unspecified wherein power and process have been combined, HVAC consists of a use-dependent part (describing the operation of devices which generate heating and cooling), and with unspecified serving as a place holder for consumption and demand until the process can find an actual end-use.

FIG. 7A is a graph of an illustrative hours of operation per day by end-use by billing period for the above categories, with FIG. 7B presenting, in pie-chart form, the percentage category breakdown.

In Tables 4 and 5, as further examples illustrative summaries of disaggregated electrical consumption and demand are respectively presented for the above categories.

TABLE 4

| | Summary of Disaggregated Consumption | | | | | | | |
|---|---|---|---|---|---|---|---|---|
| Month | Lighting Kwh | Power Kwh | HVAC Kwh | Unspecified Kwh | Average OAT | HVAC Temp Kwh/Hr | HVAC Use Kwh | HVAC Temp. Kwh |
| Total | 1,302,737 | 1,805,735 | 1,231,004 | 10,430 | 54 | | 729,083 | 501,921 |
| 365 Day Adj. | 1,302,737 | 1,805,735 | 1,231,004 | 10,430 | | | | |
| % of Bill | 29.95% | 41.51% | 28.30% | 0.24% | | | | |
| 7 | 108,808 | 145,952 | 180,471 | 814 | 73 | 366 | 56,874 | 123,597 |
| 8 | 116,710 | 152,730 | 190,154 | 895 | 73 | 364 | 62,597 | 127,557 |
| 9 | 102,837 | 167,083 | 101,537 | 806 | 65 | 145 | 56,331 | 45,206 |
| 10 | 115,278 | 132,508 | 72,366 | 859 | 58 | 39 | 60,047 | 12,319 |
| 11 | 110,863 | 161,166 | 64,051 | 913 | 49 | 3 | 63,809 | 242 |
| 12 | 108,093 | 152,264 | 75,688 | 948 | 41 | 28 | 66,271 | 9,417 |
| 1 | 115,919 | 154,539 | 94,421 | 901 | 29 | 91 | 63,013 | 31,408 |
| 2 | 98,648 | 132,214 | 79,329 | 880 | 36 | 54 | 61,517 | 17,812 |
| 3 | 106,620 | 164,234 | 75,280 | 955 | 42 | 25 | 66,785 | 8,495 |
| 4 | 107,990 | 154,053 | 60,536 | 866 | 51 | 3 | 60,536 | 0 |
| 5 | 113,335 | 153,823 | 91,952 | 817 | 63 | 111 | 57,081 | 34,871 |
| 6 | 97,636 | 135,169 | 145,219 | 776 | 70 | 300 | 54,222 | 90,997 |

TABLE 5

Summary of Disaggregated Demand

| Month | KW Lighting | KW Power | HVAC Use KW | HVAC Temp KW | Unspecified Allocation | KWA Unspecified | OA Temp. | EW Lighting | EWW Power | HVAC Use EWW | HVAC Temp EWW |
|---|---|---|---|---|---|---|---|---|---|---|---|
| Minimum | 242 | 367 | 123 | 23 | | 0 | 29 | 94.0 h | 81.5 h | 102.9 h | 0.0 h |
| Average | 242 | 367 | 123 | 230 | | 0 | 54 | 103.0 h | 103.0 h | 113.8 h | 43.9 h |
| Maximum | 242 | 367 | 123 | 511 | | 0 | 73 | 108.7 h | 108.7 h | 125.1 h | 113.3 h |
| Survey Sheet | 303 | 612 | 123 | | | | | | | | |
| % of Bill | 25.17% | 38.14% | 12.77% | 23.92% | | 0.00% | | | | | |
| 7 | 242 | 367 | 123 | 511 | 100.0% | 0 | 73 | 101.4 h | 89.7 h | 104.5 h | 54.7 h |
| 8 | 242 | 367 | 123 | 477 | 100.0% | 0 | 73 | 108.7 h | 93.9 h | 115.0 h | 60.4 h |
| 9 | 242 | 367 | 123 | 351 | 100.0% | 0 | 65 | 99.0 h | 106.2 h | 106.9 h | 30.0 h |
| 10 | 242 | 367 | 123 | 245 | 100.0% | 0 | 58 | 107.4 h | 81.5 h | 110.3 h | 11.4 h |
| 11 | 242 | 367 | 123 | 23 | 100.0% | 0 | 49 | 106.7 h | 102.4 h | 121.1 h | 2.4 h |
| 12 | 242 | 367 | 123 | 46 | 100.0% | 0 | 41 | 100.7 h | 93.6 h | 121.7 h | 46.4 h |
| 1 | 242 | 367 | 123 | 63 | 100.0% | 0 | 29 | 108.0 h | 95.0 h | 115.7 h | 113.3 h |
| 2 | 242 | 367 | 123 | 40 | 100.0% | 0 | 36 | 101.8 h | 90.0 h | 125.1 h | 110.8 h |
| 3 | 242 | 367 | 123 | 74 | 100.0% | 0 | 42 | 99.3 h | 101.0 h | 122.7 h | 26.0 h |
| 4 | 242 | 367 | 123 | 152 | 100.0% | 0 | 51 | 104.0 h | 97.9 h | 114.9 h | 0.0 h |
| 5 | 242 | 367 | 123 | 343 | 100.0% | 0 | 63 | 105.6 h | 94.6 h | 104.8 h | 23.0 h |
| 6 | 242 | 367 | 123 | 441 | 100.0% | 0 | 70 | 94.0 h | 85.9 h | 102.9 h | 48.2 h |

Figure 8A:
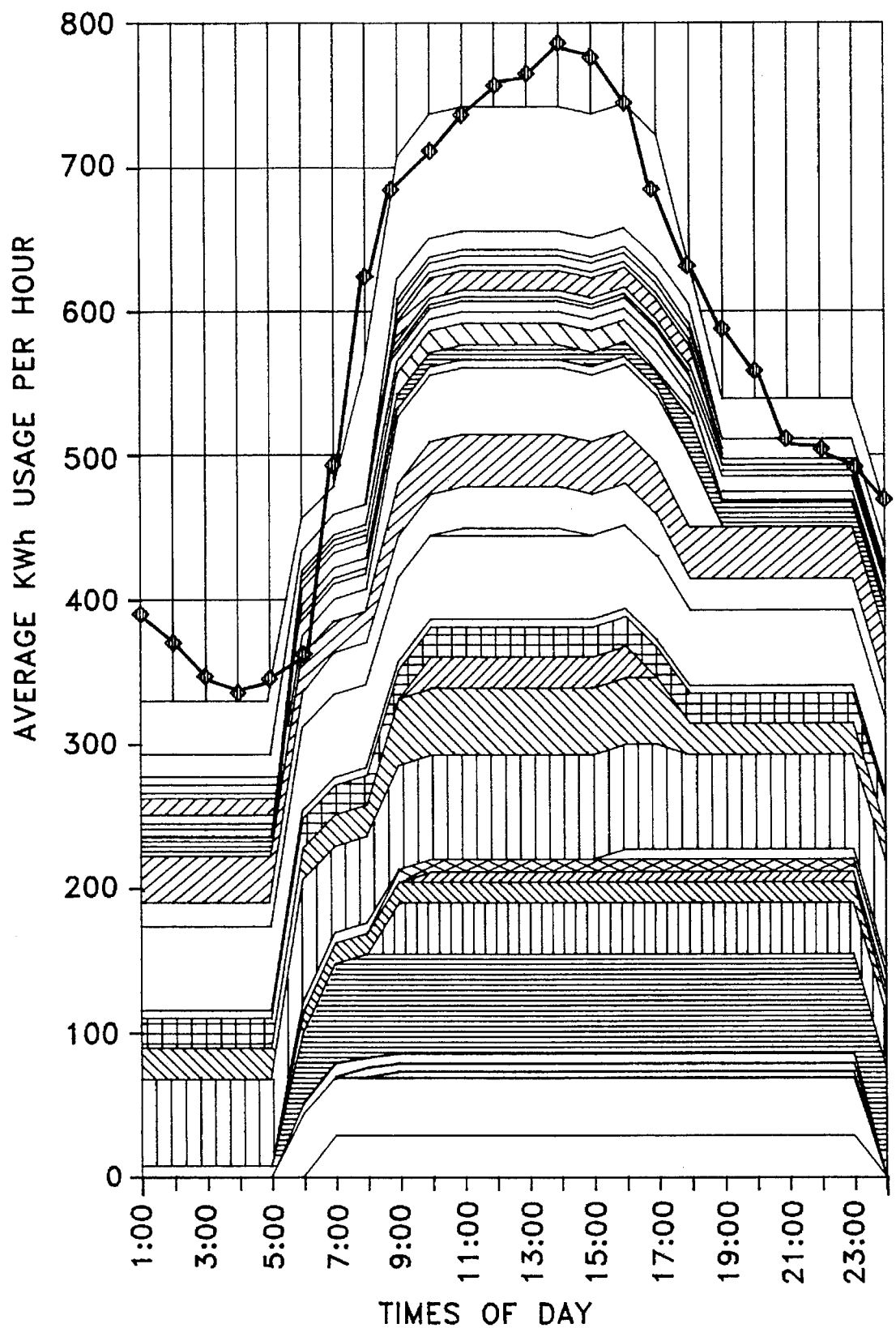
Figure 8B:
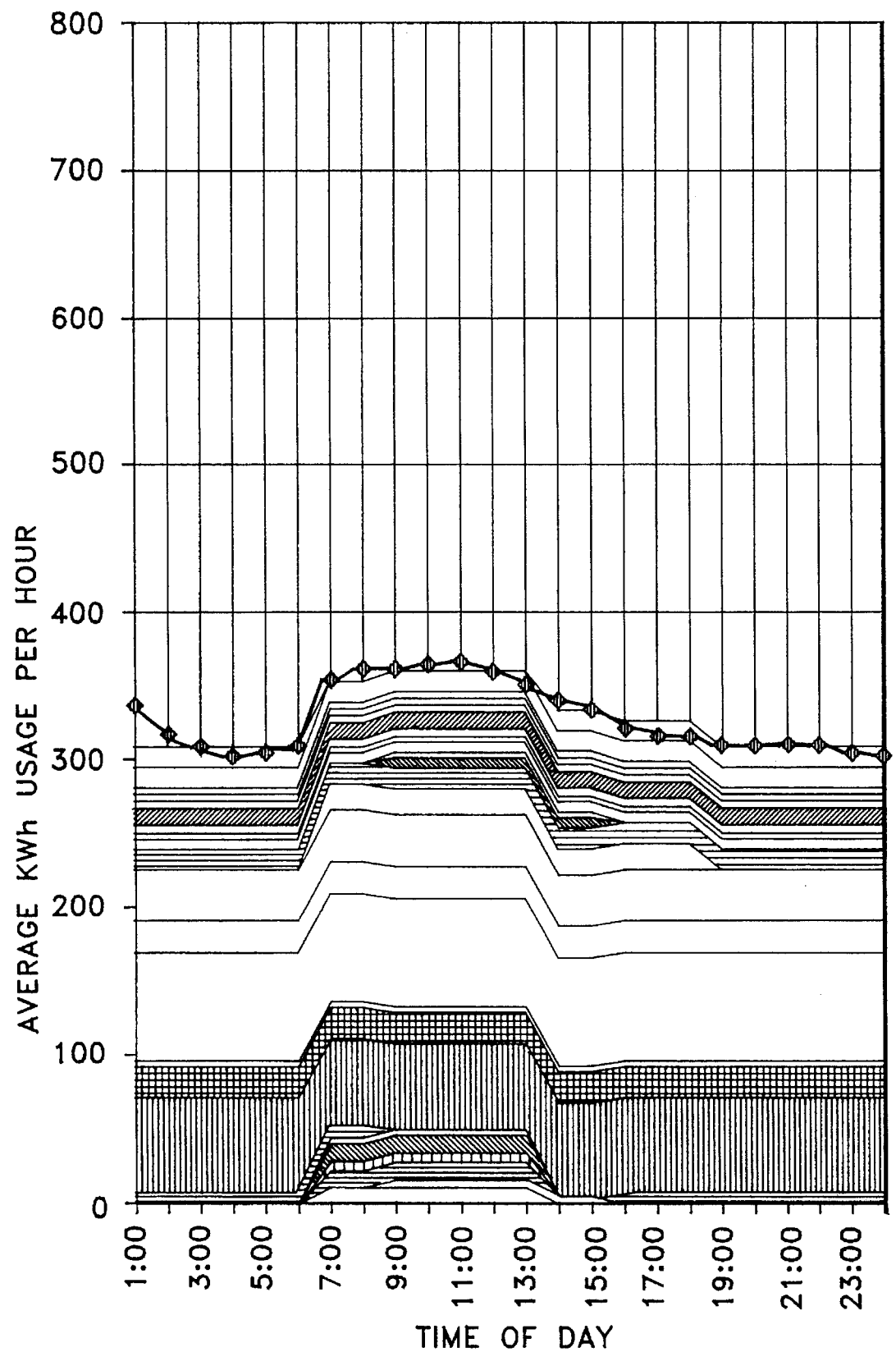

A typical week-day, hourly consumption profile is presented in FIG. 8A for the various categories, and a typical week-end hourly consumption profile, in FIG. 8B. The line on these charts represents the actual profile of energy consumption at a facility; and the stacked area graphs sum the estimates made in the model.

Clearly, other configurations of process flow may be employed within the broad outline of the philosophy underlying the present invention; and further modifications will also occur to those skilled in this art, and such are considered to fall within the spirit and scope of the invention as defined in the appended claims.

What is claimed is:

1. A process for making retrofitting changes in lighting, power/process and HVAC devices in a facility having lighting, power/process and HVAC energy-consuming devices distributed there-through and at which facility there is controlling of the operating of said devices on fixed schedules that comprises, first, determining possible retrofitting changes in the facility and its devices that might affect energy conservation if made;

secondly, thereupon implementing such retrofitting changes in the facility and its devices; and thirdly, verifying the actual energy conservation produced thereby;

said determining being effected by producing an energy consumption and demand estimate by the following modeling steps (1) providing monthly electric bill data for the facility over a twelve consecutive month period to ascertain therefrom billing periods and KW and Kwh consumption and to obtain from the ratio thereof (Kwh/KW) the hours of peak demand per week, which provides an estimate of hours of use for the facility; (2) providing facility area and daily minimum and maximum outside weather temperature data for the prior twelve months; (3) collating said data; (4) identifying from the provided and collated data, patterns of energy consumption and demand; (5) desegregating KW demand among end-uses of lighting, power/process, and HVAC use-dependent, and producing estimates of their effective connected load at peak demand, while attributing the remaining KW not disturbed among such end-uses to HVAC temperature-dependent end-use; (6) desegregating energy consumption according to end-use by using the said estimate of hours of use of the facility and attributing remaining consumption to HVAC end-use; (7) performing analysis of regressing consumption against a polynomial of outside temperature data for lighting/power and HVAC use-dependent hours of operation; (8) adjusting the hours of operation estimates across the monthly data for a best-fit curve and optimization; (9) predicting energy conservation potential by analyzing performance characteristics of proposed retrofit changes against existing operating conditions; and relating and displaying the predicted energy conservation potential as an estimated hour/demand curve;

said retrofitting change implementing being effected upon the selecting of the proposed retrofit changes and in response thereto, by changing the said controlling at the facility, thereupon to effect the device operating schedule changes required for said retrofitting;

said verifying of the actual energy conservation produced after the retrofitting changes are made, being effected by monitoring at the retrofitted facility the real time actual energy consumption to produce an actual operating hour/demand curve, and comparing the displayed estimated hour/demand curve with the actual real time operating curve to verify the energy conservation actually achieved after retrofit with the predicted energy conservation potential.

2. A process as claimed in claim 1 and in which the said performance characteristics are verified, and then the retrofit changes are implemented according to the predictions to achieve corresponding conservation in the facility.

3. A process as claimed in claim 1 and in which the said estimates of the effective connected load at peak demand for lighting, power and process are held at constant level during the analysis across all billing periods except as modified by changes in the total usage of the facility.

4. A process as claimed in claim 1 and in which the estimates are refined by actual data, with each end-use category becoming the sum of defined devices in the facility and their hours of operation, with unspecified operating hours quantified as required to account for all consumption within the end-use.

5. A process as claimed in claim 1 and in which the actual results of making a retrofit change in energy consuming equipment in the facility are quantified by calculating the difference in consumption before and after the retrofit.

6. A process as claimed in claim 5 and in which the value of energy savings is calculated by normalizing the before-retrofit billing data to current billing data period and weather temperature conditions, using said equations developed for the total bill in the said statistical analysis, and subtracting after-retrofit billing data to identify the differential.

7. A process as claimed in claim 1 and in which said disaggregating of the utility bills is effected while developing an optimal set of statistics accurately to describe the monthly variations in billing data.

8. A process as claimed in claim 7 and in which equations for said regressing are both linear to describe the hours of use components of the bills, and polynomial because the relation of consumption to weather is a curve.

9. A process as claimed in claim 1 and in which normative statistics are provided to permit the user to verify that the said disaggregating has been properly effected.

10. A process as claimed in claim 1 and in which the regression analysis is used to effect said optimization of the assumptions of a load shape corresponding to actual patterns of consumption and demand at the facility, thereby to develop high correlation and minimal monthly residuals.

11. A process as claimed in claim 1 and in which the said analysis of the total bill is performed on a polynomial of OAT and lighting hours of use as well as process hours of use as well as the HVAC use-dependent hours of use to account for the usage-dependent portion of each bill, but the regressing analysis of the disaggregated HVAC portion of the bill, where performed on the same temperature-dependent factors, only takes into account HVAC use-dependent hours of use which define the hours of use for the facility.

12. A process as claimed in claim 11 and in which said optimization is achieved by adjusting the monthly hours of use for lighting, process and HVAC use-dependent within predefined margins through automatic use of linear programming techniques, driving monthly residuals to a minimum for both the total bill and its HVAC component with high confidence factor.

13. A process as claimed in claim 12 and in which said disaggregating and optimization are repeated until a representation matching actual conditions at the facility is attained.

14. A process as claimed in claim 13 and in which the results of the optimized analyses are fed back to data collation for storage and use.

15. A process as claimed in claim 14 and in which weekday and weekend consumption profiles are graphically presented as part of the feed back data to provide usual confirmation that the facility assumptions are justified.

16. A process as claimed in claim 1 and in which two day types, two operating rates and a time descriptor to indicate which is when are employed as a data input.

17. A process as claimed in claim 1 and in which the actual facility operating hour/demand is monitored in real time and compared with the estimate thereof.

18. A process as claimed in claim 17 and in which the monitored and estimated hour/demand data are both visually displayed and compared.

19. A process as claimed in claim 1 and in which, in the event of significant deviations between the estimated and actual curves, the modeling steps (1) through (8), above, are repeated with further data to improve the reliability of the modeling; and thereupon, further changing the retrofitting of the facility in accordance with the revised estimates of the further modeling by changing the said controlling at the facility upon the selecting of the revised retrofitting changes and in response thereto, to effect the device operating schedule changes required for the revised retrofitting.

* * * * *